(12) United States Patent
Ogawa et al.

(10) Patent No.: US 8,041,672 B2
(45) Date of Patent: Oct. 18, 2011

(54) MANAGEMENT DEVICE AND COMPUTER SYSTEM

(75) Inventors: Yukio Ogawa, Tokyo (JP); Koki Nakashiro, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 393 days.

(21) Appl. No.: 12/324,965

(22) Filed: Nov. 28, 2008

(65) Prior Publication Data

US 2010/0082555 A1    Apr. 1, 2010

(30) Foreign Application Priority Data

Sep. 25, 2008    (JP) ................................ 2008-246356

(51) Int. Cl.
*G06F 17/00*    (2006.01)
(52) U.S. Cl. ........................................ 707/609; 707/821
(58) Field of Classification Search ........................ None
See application file for complete search history.

(56) References Cited

U.S. PATENT DOCUMENTS

| 7,337,185 | B2 * | 2/2008 | Ellis et al. ............................. 1/1 |
| 7,661,136 | B1 * | 2/2010 | Spielman ......................... 726/22 |
| 2002/0101994 | A1 * | 8/2002 | Shinzaki ........................ 380/277 |
| 2004/0236984 | A1 * | 11/2004 | Yamasaki ........................ 714/6 |
| 2006/0078160 | A1 * | 4/2006 | Fujita et al. ................... 382/100 |
| 2007/0255767 | A1 * | 11/2007 | Kikuchi ......................... 707/204 |
| 2008/0059718 | A1 * | 3/2008 | Tajima et al. ................. 711/148 |

FOREIGN PATENT DOCUMENTS

JP    06-187213    7/1994

* cited by examiner

*Primary Examiner* — Hung Q Pham
(74) *Attorney, Agent, or Firm* — Antonelli, Terry, Stout & Kraus, LLP.

(57) ABSTRACT

A management device connected to a file server providing a computer with file data stored in a storage subsystem, and collects information about access to the file data. In the management device, a log of access to the file data stored in the storage subsystem is collected as access data, and the access data for the same file data is grouped. With such a configuration, a large amount of information about access to the file data can be easily used, and the amount of information can be compressed.

8 Claims, 20 Drawing Sheets

FIG. 5

| FILE ACCESS ID 501 | OPERATION START TIME 502 | OPERATION END TIME 503 | FILE 504 | USER 505 | GROUP 601 | IP ADDRESS 602 | OPERATION 603 | BACKUP 604 |
|---|---|---|---|---|---|---|---|---|
| : | : 531 | : 532 | : 533 | : 534 | : 535 | : 536 | : 537 | : 538 |
| 101 | 2008/05/30 15:05:02 | 2008/05/30 15:05:03 | /home/user1/A1/ A1presentation.ppt | user1 | group1 | 192.168.3.8 | read | |
| 102 | 2008/05/30 15:05:55 | 2008/05/30 15:05:56 | /home/user1/A1/ A1presentation.ppt | user1 | group1 | 192.168.3.8 | read | |
| 103 | 2008/05/30 15:06:30 | 2008/05/30 15:06:31 | /home/user1/A1/ A1presentation.ppt | user1 | group1 | 192.168.3.8 | read | |
| 104 | 2008/05/30 15:08:15 | 2008/05/30 15:08:16 | /home/user1/B1/ B1presentation.pdf | user1 | group1 | 192.168.3.8 | read | /home/user1/backup/A1/ A1presentation _20080530_150859.ppt 541 |
| 105 | 2008/05/30 15:08:58 | 2008/05/30 15:08:59 | /home/user1/A1/ A1presentation.ppt | user1 | group1 | 192.168.3.8 | write | |
| : | : | : | : | : | : | : | : | : |
| 111 | 2008/05/30 16:30:22 | 2008/05/30 16:30:23 | /home/user2/A1/ A0presentation.pdf | user2 | group1 | 192.168.4.5 | read | |
| : | : | : | : | : | : | : | : | : |
| 121 | 2008/05/30 16:33:15 | 2008/05/30 16:33:16 | /home/user1/B1/ B1presentation.pdf | user1 | group1 | 192.168.3.8 | read | |
| : | : | : | : | : | : | : | : | : |
| 131 | 2008/05/30 16:48:15 | 2008/05/30 16:48:16 | /home/user1/A1/ A1presentation.ppt | user1 | group1 | 192.168.3.8 | write | /home/user1/backup/A1/ A1presentation _20080530_164816.ppt |
| : | : | : | : | : | : | : | : | : |

| FILE ACCESS ID | PREVIOUS FILE ACCESS ID | NEXT FILE ACCESS ID |
|---|---|---|
| ⋮ | ⋮ | ⋮ |
| 101 | NULL | 102 |
| 102 | 101 | 103 |
| 103 | 102 | 105 |
| 104 | NULL | (id-b1) |
| 105 | 103 | (id-a1) |
| ⋮ | ⋮ | ⋮ |
| 111 | NULL | NULL |
| ⋮ | ⋮ | ⋮ |
| 121 | (id-b2) | NULL |
| ⋮ | ⋮ | ⋮ |
| 131 | (id-a2) | NULL |
| ⋮ | ⋮ | ⋮ |

FIG. 6B

| FILE ACCESS GROUP ID | START FILE ACCESS ID | END FILE ACCESS ID |
|---|---|---|
| ⋮ | ⋮ | ⋮ |
| 1001 | 101 | 131 |
| 1002 | 104 | 121 |
| ~~1003~~ | ~~111~~ | ~~111~~ |
| ⋮ | ⋮ | ⋮ |

FIG. 6C

| FILE ACCESS GROUP ID | RELATED FILE ACCESS GROUP ID | DEGREE OF RELEVANCE |
|---|---|---|
| ⋮ | ⋮ | ⋮ |
| 1001 | 1002 | 0.8 |
| 1002 | 1001 | 1.0 |
| ⋮ | ⋮ | ⋮ |

FIG. 10

| | FILE ACCESS ID | OPERATION START TIME | OPERATION END TIME | FILE | USER | GROUP | IP ADDRESS | OPERATION | BACKUP |
|---|---|---|---|---|---|---|---|---|---|
| | .. | .. | .. | .. | .. | .. | .. | .. | .. |
| 801 | 101 | 2008/05/30 15:05:02 | 2008/05/30 16:48:16 | /home/user1/A1/ A1presentation.ppt | user1 | group1 | 192.168.3.8 | read: 7, write: 20 | /home/user1/backup/A1/ A1presentation _20080530_164816.ppt |
| 802 | 104 | 2008/05/30 15:08:15 | 2008/05/30 16:33:16 | /home/user1/B1/ B1presentation.pdf | user1 | group1 | 192.168.3.8 | read: 15, write: 0 | |
| 803 | 111 | 2008/05/30 16:30:22 | 2008/05/30 16:30:23 | /home/user2/A1/ A0presentation.pdf | user2 | group1 | 192.168.4.5 | read: 1, write: 0 | |
| | .. | .. | .. | .. | .. | .. | .. | .. | .. |

FIG. 11

| | WEB ACCESS ID 901 | OPERATION START TIME 902 | OPERATION END TIME 903 | URL 904 | USER 905 | IP ADDRESS 906 | OPERATION 907 |
|---|---|---|---|---|---|---|---|
| | .. | .. | .. | .. | .. | .. | .. |
| 911 | 101 | 2008/05/30 15:02:34 | 2008/05/30 15:02:35 | http://search/ | user1 | 192.168.3.8 | GET |
| 912 | 102 | 2008/05/30 15:02:23 | 2008/05/30 15:02:24 | http://search/ | user1 | 192.168.3.8 | POST |
| 913 | 103 | 2008/05/30 15:02:00 | 2008/05/30 15:02:01 | http://search/ | user1 | 192.168.3.8 | GET |
| | .. | .. | .. | .. | .. | .. | .. |
| 914 | 111 | 2008/05/30 15:02:13 | 2008/05/30 15:02:14 | http://url2/page1.html | user1 | 192.168.3.8 | GET |
| 915 | 112 | 2008/05/30 15:08:08 | 2008/05/30 15:08:09 | http://url2/page2.html | user1 | 192.168.3.8 | GET |
| 916 | 113 | 2008/05/30 15:15:17 | 2008/05/30 15:15:18 | http://url2/page3.html | user1 | 192.168.3.8 | GET |
| | .. | .. | .. | .. | .. | .. | .. |
| 917 | 121 | 2008/05/30 15:27:14 | 2008/05/30 15:27:16 | http://url5/page2.html | user2 | 192.168.4.5 | GET |
| | .. | .. | .. | .. | .. | .. | .. |
| 918 | 131 | 2008/05/30 15:40:55 | 2008/05/30 15:40:56 | http://url2/page8.html | user1 | 192.168.3.8 | GET |
| | .. | .. | .. | .. | .. | .. | .. |

FIG. 12A

| WEB ACCESS ID | PREVIOUS WEB ACCESS ID | NEXT WEB ACCESS ID |
|---|---|---|
| ⋮ | ⋮ | ⋮ |
| 101 | NULL | 102 |
| 102 | 101 | 103 |
| 103 | 102 | NULL |
| ⋮ | ⋮ | ⋮ |
| 111 | NULL | 112 |
| 112 | 111 | 113 |
| 113 | 112 | (id-u1) |
| ⋮ | ⋮ | ⋮ |
| 121 | NULL | NULL |
| ⋮ | ⋮ | ⋮ |
| 131 | (id-u2) | NULL |
| ⋮ | ⋮ | ⋮ |

FIG. 12B

| WEB ACCESS GROUP ID | START WEB ACCESS ID | END WEB ACCESS ID |
|---|---|---|
| ⋮ | ⋮ | ⋮ |
| 1001 | 101 | 103 |
| 1002 | 111 | 131 |
| 1003 | 121 | 121 |
| ⋮ | ⋮ | ⋮ |

FIG. 12C

| FILE ACCESS GROUP ID | RELATED WEB ACCESS GROUP ID | DEGREE OF RELEVANCE |
|---|---|---|
| ⋮ | ⋮ | ⋮ |
| 1001 | 1002 | 0.3 |
| 1002 | 1002 | 0.4 |
| ⋮ | ⋮ | ⋮ |

*FIG. 13*

```
                                                              ~1100
   BEGIN:VCALENDAR
      :
      :
   BEGIN:VEVENT
      :
      :
   END:VEVENT                                      ~1101
1111─┬─BEGIN:VEVENT
1112─┼─SUMMARY:A1presentation.ppt
1113─┼─DTSTART:20080530T150502
1114─┼─DTEND:20080530T164816
1115─┼─LOCATION:SHINAGAWA OFFICE
1116─┼─URL:¥¥file_server¥user1¥backup¥A1¥A1presentation_20080530_164816.ppt
1117─┼─DESCRIPTION:UPDATE (read: 7, write: 20)
1118─┼─CATEGORIES:FILE SERVER (UPDATE)
1119─┴─END:VEVENT
   BEGIN:VEVENT
      :
      :
   END:VEVENT
      :
      :
   END:VCALENDAR
```

FIG. 16A

| WORD | FILE DATA ID |
|---|---|
| "FUNCTION" | 1, 3, 4, 5 |
| "PROPOSAL" | 2, 3, 4 |
| "PRODUCT A1" | 3, 6, 7 |
| ⋮ | ⋮ |

FIG. 16B

| FILE ACCESS GROUP ID | FILE DATA ID |
|---|---|
| ⋮ | ⋮ |
| 1001 | 15 |
| 1002 | 120 |
| 1003 | 1 |
| ⋮ | ⋮ |

FIG. 20

| FILE DATA ID | STORAGE ID | LOCATION |
|---|---|---|
| 1 | 1 | /dev/sda |
| 2 | 3 | /dev/sda |
| 3 | 2 | /dev/sda |
| ⋮ | ⋮ | ⋮ |

MANAGEMENT DEVICE AND COMPUTER SYSTEM

CROSS REFERENCES TO RELATED APPLICATIONS

This application relates to and claims priority from Japanese Patent Application No. 2008-246356, filed on Sep. 25, 2008, the entire disclosure of which is incorporated herein by reference.

BACKGROUND OF THE INVENTION

1. Field of the Invention

The present invention relates to a computer system that manages file data stored in a storage system and, more specifically, to a technology for storing, managing, and utilizing a log about access to the file data stored in the storage system.

2. Description of the Related Art

For creating file data, a user uses a client computer such as personal computer with an application program such as document processing program. The file data created as such is generally stored for use in a hard disk provided to the client computer.

However, the hard disk provided to the client computer has the problem of being limited in capacity, and the problem of being easily broken if with any physical impact. In consideration thereof, the user often stores, for use, file data in a large-capacity network-connection-type storage system equipped with RAID (Redundant Arrays of Inexpensive Disks).

In view of information risk management in corporations such as measures to deal with compliance, regulatory constraints, e-discovery, and others, with the recently advanced technology, file data in a plurality of client computers is collectively managed in a large-capacity storage system to be connected to a network.

With respect to the file data stored in the storage system with such a technology, an operator of the storage system logs and manages information about access to the file data for improving the reusability (searchability) and for information risk management.

When a plurality of file data are separately stored in a plurality of storage systems, for migration of the file data among the storage systems considering the performance capabilities and the cost of the storage systems, for example, the access history is created for the file data.

In consideration thereof, disclosed is the technology of managing information about access to the file data on the side of the storage system. An example includes Patent Document 1 (JP-A-6-187213).

SUMMARY OF THE INVENTION

With the technology of Patent Document 1, the access information about any specific file data is indeed managed, but there is no disclosure about grouping of access information about any same file data.

As such, the technology of Patent Document 1 indeed reduces the amount of access information through management thereof only with respect to any specific file data, but makes no attempt of easing the use of access information or compressing the access information to reduce the amount thereof by grouping the access information on file data basis.

With no grouping of access information as such, the technology surely gives no thought to the degree of relevance between the groups of access information.

Considered here is a case where a user operates file data on a client computer using an application program. In this case, on the side of a storage system storing the file data, the series of user's operations involved in opening and closing the file data on the application program from the user's point of view may be logged as a plurality of access information intermittently repeating many times the operations of opening and closing the file data.

If this is the case, the access information logged on the side of the storage system represents only a part of the user's series of operations related to the file data. Therefore, for the access information to represent the series of operations closer to the user's point of view based on the access information logged on the side of the storage system, there needs to group each of the access information logged on the side of the storage system.

Considered also is a case where the user operates a plurality of file data on the client computer using a plurality of application programs. In this case, even if the user goes through any operations related to a plurality of file data from the user's point of view, on the side of the storage system storing the file data, the operations are each logged as access information about each of the file data.

If this is the case, the access information logged on the side of the storage system is not representing any correlation between the user's operations made to a plurality of file data. As such, for the access information to represent any correlation between the operations made to a plurality of file data closer to the user's point of view based on the access information logged on the side of the storage system, there needs to establish a correlation among the access information about a plurality of file data logged on the side of the storage system.

In consideration thereof, an object of the invention is to provide a file access information management system with functions of, when there is a large amount of access information with respect to a piece of file data, if a series of user's operations with respect to the file data is logged as a plurality of access information intermittently repeating many times on the side of the storage system, easing the use of the access information with respect to the file data, and compressing the access information to reduce the amount thereof.

Another object of the invention is to provide a file access information management system with a function of, when access information is plurally found at the same time with respect to a plurality of file data, if a series of user's operations with respect to a plurality of file data is logged as each independent access information on the side of the storage system, easing the simultaneous use of the access information with respect to a plurality of the file data.

BRIEF DESCRIPTION OF THE DRAWINGS

FIG. 5 is a diagram illustrating a management table of file access data in the first embodiment of the invention;

FIG. 6A is a diagram illustrating a management table for use to be ready for grouping of the file access data in the first embodiment of the invention;

FIG. 6B is a diagram illustrating a management table of file access group data in the first embodiment of the invention;

FIG. 6C is a diagram illustrating a management table including an element of "degree of relevance" for the file access group data in the first embodiment of the invention;

FIG. 10 is a diagram illustrating a management table of compressed file access data in the first embodiment of the invention;

FIG. 11 is a diagram illustrating a management table of web access data in the first embodiment of the invention;

FIG. 12A is a diagram illustrating a management table for use to be ready for grouping of web access group data in the first embodiment of the invention;

FIG. 12B is a diagram illustrating a management table of the web access group data in the first embodiment of the invention;

FIG. 12C is a diagram illustrating a management table including an element of "degree of relevance" for the web access group data in the first embodiment of the invention;

FIG. 13 is a diagram illustrating calendar data in the first embodiment of the invention;

FIG. 16A is a diagram illustrating a management table of index data in the second embodiment of the invention;

FIG. 16B is another diagram illustrating the management table of the index data in the second embodiment of the invention;

FIG. 20 is a diagram illustrating a management table of file data storage locations of file data in the third embodiment of the invention.

DESCRIPTION OF THE PREFERRED EMBODIMENTS

In the below, embodiments of the invention are described.

Figure 1:
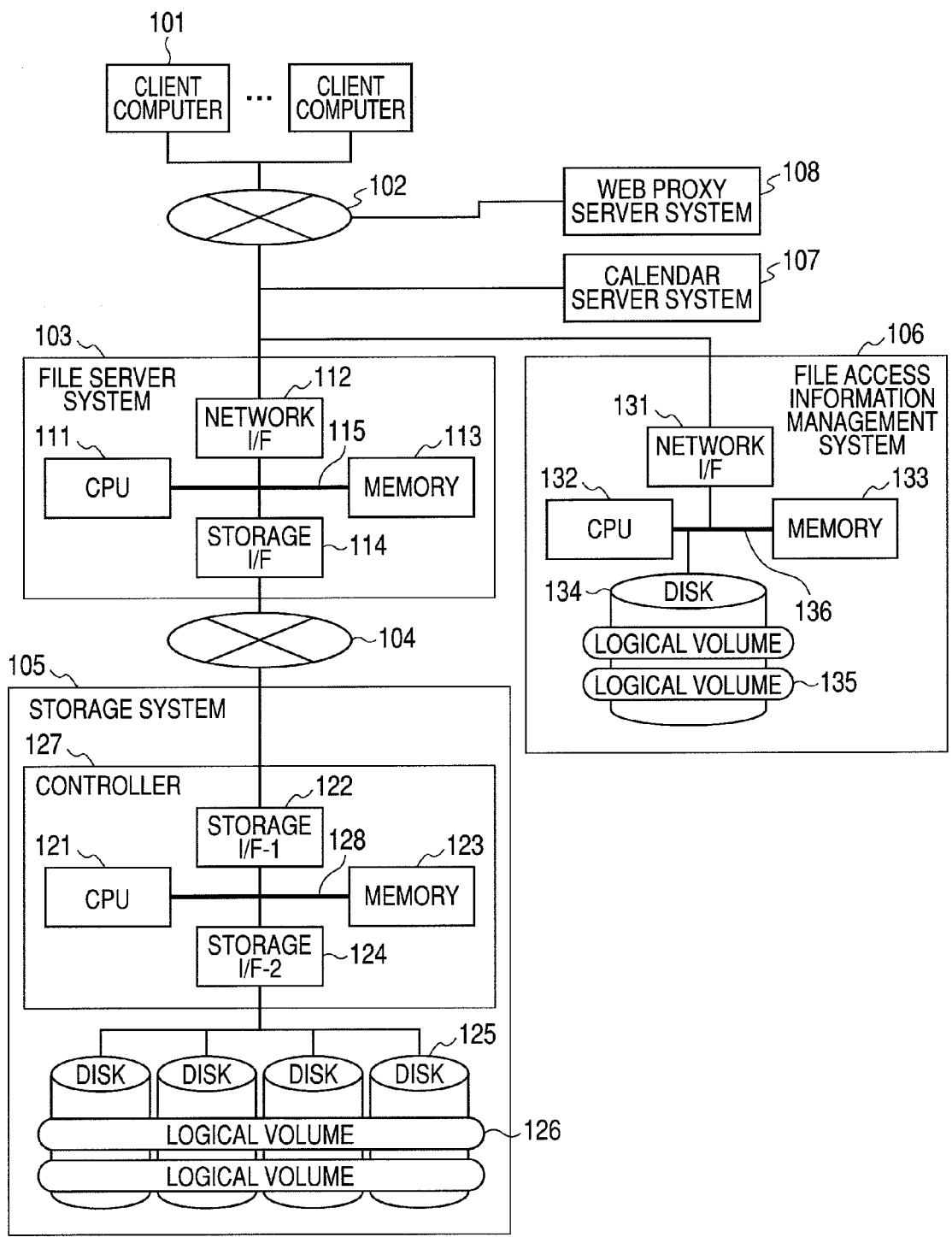
FIG. 1 is a block diagram showing the system configuration in a first embodiment of the invention.

FIG. 1 is a block diagram showing the system configuration in a first embodiment of the invention.

A computer system in the first embodiment is configured to include one or more client computers 101, a client-server network 102, a file server system 103, a storage-storage network 104, a storage system 105, a file access information management system 106, a calendar server system 107, and a web proxy server system 108.

The client computer 101 is a terminal for use by a user to issue a request of file access with respect to the file server system 103. The client computer 101 is of the configuration same as that of a general personal computer, and includes computer resources such as CPU (Central Processing Unit), memory, hard disk, and network interface. The client computer 101 also includes an internal signal line, an output unit, and an input unit.

The client-server network 102 is a general communications path over which communications packets are transferred in accordance with an IP (Internet Protocol) protocol or others. The client-server network 102 is exemplified by the Internet, intranet, or a communications network in combination thereof.

The file server system 103 is a server that provides file access services in response to the file access request coming from the client computer 101. For provision of file access services from the file server system 103 to the client computer 101, used may be CIFS (Common Internet File System), NFS (Network File System), WebDAV (Web-based Distributed Authoring and Versioning), or others.

The file server system 103 is configured to include computer resources such as a CPU 111, a memory 113, a network interface (I/F) 112, and a storage interface 114, and an internal signal line 115.

The CPU 111 is a processor, and executes various types of processing by running programs stored in the memory 113.

The memory 113 is a volatile memory capable of high-speed access, for example, and stores therein programs to be run by the CPU 111, information needed by the CPU 111, and others.

The network interface 112 is implemented by a network interface card such as IEEE (Institute of Electrical and Electronics Engineers) 802.3 interface card capable of handling various communications speeds, e.g., 1 Gbps and 10 Gbps. The network interface 112 serves as a data input/output adaptor for use to establish a connection to the file access information management system 106 and the client computer 101 over the client-server network 102. The network interface 112 transmits/receives data and control signals to/from other devices based on TCP/IP (Transmission Control Protocol/Internet Protocol), for example.

The storage interface 114 is implemented by an interface card capable of handling various communications speeds, e.g., 1 Gbps and 10 Gbps, such as IEEE 802.3 interface card, SCSI (Small Computer System Interface) interface card, FC (Fibre Channel) interface card, USB (Universal Serial Bus) interface card, or IEEE 1394 interface card. The storage interface 114 serves as a data input/output adaptor for establishing a connection to the storage system 105.

The internal signal line 115 establishes a connection among the components, i.e., the CPU 111, the memory 113, the network interface 112, and the storage interface 114. The internal signal line 115 is exemplified by a bus.

The storage-storage network 104 is a communications path for data exchange between the file server system 103 and the storage system 105. To the storage-storage network 104, a communications protocol such as IEEE 802.3, SCSI, FC, USB, or IEEE 1394 is applied.

The storage system 105 is a memory device that provides the client computer 101 and the file server system 103 with a storage area for storage of data.

The storage system 105 is configured to include a plurality of disks 125, and a controller 127 for control over the disks 125.

The controller 127 is configured to include a CPU 121, a memory 123, a storage I/F-1 (122), a storage I/F-2 (124), and an internal signal line 128.

The disks 125 are each a storage unit such as FC (Fibre Channel) disk drive, SATA (Serial Advanced Technology Attachment) disk drive, PATA (Parallel Advanced Technology Attachment) disk drive, FATA (Fibre Attached Technology Adapted) disk drive, SAS (Serial Attached SCSI) disk drive, or SCSI (Small Computer System Interface) disk drive. Herein, the disk 125 may be implemented by a nonvolatile semiconductor memory, or a combination of any of the disk drives exemplified above and a nonvolatile semiconductor memory. The nonvolatile semiconductor memory is exemplified by a flash memory.

The controller 127 is capable of controlling a plurality of disks 125 with RAID levels, (e.g., 0, 1, and 5), defined by the so-called RAID. With the RAID, the controller 127 manages a plurality of disks 125 as a RAID group, and on the RAID group, defines a plurality of logical volumes 126 each being a unit for access from the file server system 103. The logical volumes 126 are each allocated with a LUN (Logical Unit Number). The file system of the file server system 103 writes/reads data to/from the logical volumes 126 on a block basis.

The CPU 121 is a processor that controls an I/O (Input/Output) process, e.g., data reading and writing, with respect to a plurality of disks 125 in response to a data input/output request coming from the file server system 103.

The memory 123 stores therein various types of programs and management tables for the logical volumes 126, and is implemented by a volatile memory capable of high-speed access, for example.

The storage I/F-1 (122) is configured by the interface card same as for the storage I/F 114 of the file server system 103, and serves as a data input/output adaptor for establishing a connection to the file server system 103. The storage I/F-1 also establishes a connection to the file server system 103 over the storage-storage network 104, and transmits/receives data and control signals based on a protocol such as IEEE 802.3, SCSI, FC, USB, or IEEE 1394.

The storage I/F-2 (124) has the functions similar to those of the storage interface 114 of the file server system 103, and controls a data input/output request to the disks 125 based on the protocol for controlling the disks 125.

The internal signal line 127 establishes a connection among the components, i.e., the CPU 121, the memory 123, the storage I/F-1 (122), and the storage I/F-2 (124). The internal signal line 128 is exemplified by a bus.

The file access information management system 106 is a server that manages access information for offering file access services to the client computer 101 in response to the file access request coming therefrom.

The file access information management system 106 is configured to include computer resources such as a CPU 132, a memory 133, a network interface 131, and a disk 134, and an internal signal line 136.

The CPU 132 executes, similarly to the CPU 111 of the file server system 103, various types of processing by running programs stored in the memory 133.

The memory 133 is a volatile memory capable of high-speed access similarly to the memory 113 of the file server system 103, and stores therein programs to be run by the CPU 132, and information needed by the CPU 132, for example.

The network I/F 131 is implemented by, similarly to the network I/F 112 of the file server system 103, a network interface card such as IEEE 802.3 interface card capable of handling various communications speeds, e.g., 1 Gbps and 10 Gbps. The network I/F 131 serves as a data input/output adaptor for use to establish a connection, over the client-server network 102, among the components, i.e., the file server system 103, the calendar server system 107, and the web proxy server system 108. The network I/F 131 transmits/receives data and control signals to/from other devices based on TCP/IP, for example.

The disk 134 is a storage unit such as SATA disk drive, SAS disk drive, or SCSI disk drive. The disk 134 is set thereon with a plurality of logical volumes 135, and stores therein various types of information such as operating system, application program, and user data.

The internal signal line 136 is exemplified by a bus similarly to the internal signal line 115 of the file server system 103. The internal signal line 136 establishes a connection among the components, i.e., the CPU 132, the memory 133, the network interface 131, and the disk 134.

Alternatively, the file access information management system 106 may be configured similarly to the file server system 103, or the file server system 103 may be provided with the functions of the file access information management system 106 that will be described later.

The calendar server system 107 is a server that converts the file access information into the format of calendar data, and provides the result to the client computer 101. The file access information here is the one provided from the client computer 101 under the management of the file access information management system 106 to the file server system 103.

The calendar server system 107 is of the system configuration same as that of the file access information management system 106.

The web proxy server system 108 is a server that establishes, for the client computer 101 to access a web page provided by a web server on the Internet or intranet, a connection to the web server as a proxy of the client computer 101.

The web proxy server system 108 is of the system configuration same as that of the file access information management system 106.

Figure 2:
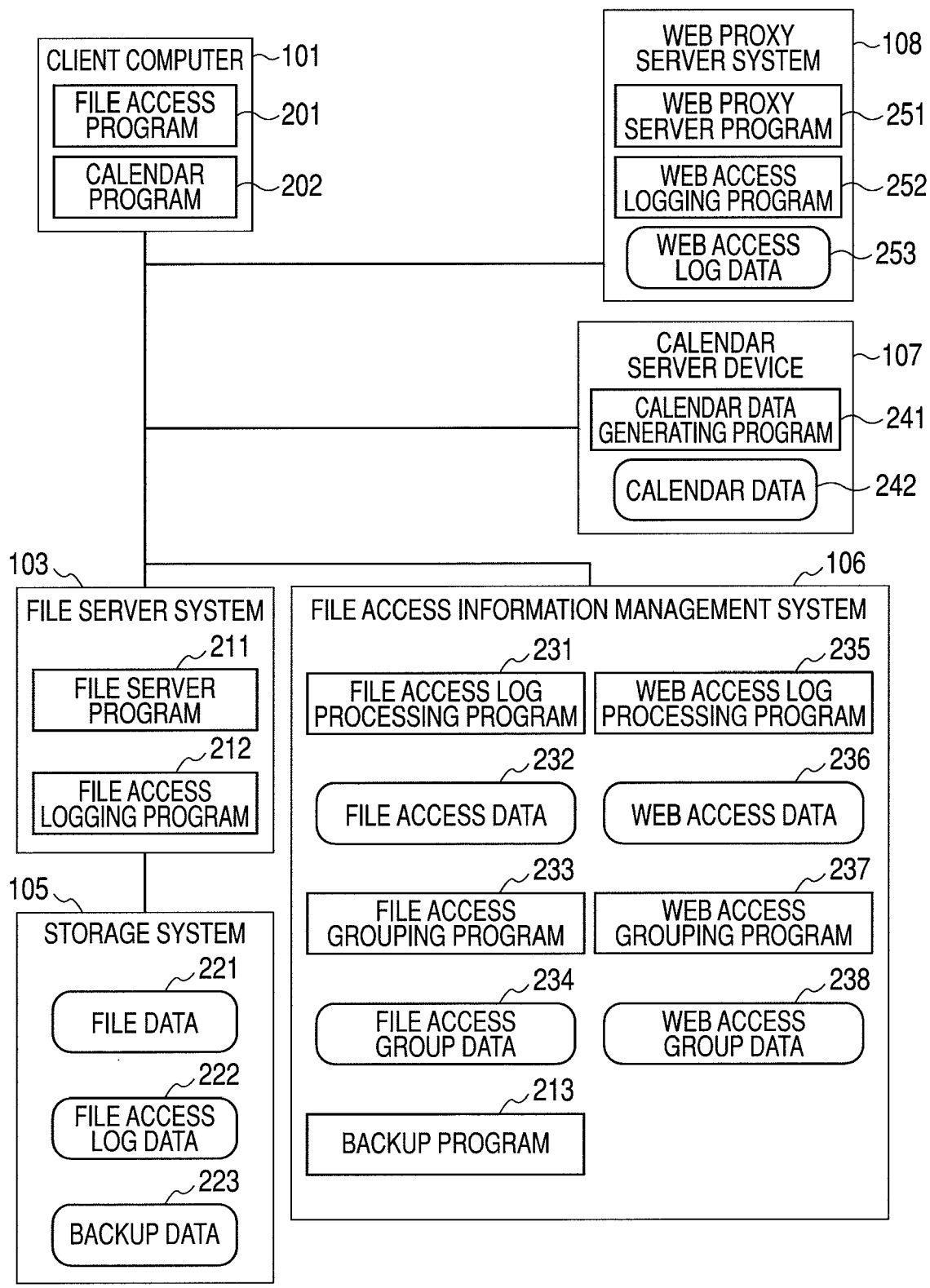
FIG. 2 is a functional block diagram of a computer system in the first embodiment of the invention.

FIG. 2 is a functional block diagram of a computer system in the first embodiment of the invention.

Programs in the devices are stored in the memories respectively equipped therein, and are run by the CPUs respectively equipped therein.

Data in the devices of FIG. 2 is stored in disks respectively equipped therein. Herein, the data for the file access information management system 106 may be stored in the disk 134 provided to the file access information management system 106, or in the memory 133 provided to the file access information management system 106. Alternatively, data for the file access information management system 106 may be stored in the disk 125 provided to the storage system 105.

The programs and data for the devices of FIG. 2 are described below, but the processing of the programs and the details of the data will be described later.

The client computer 101 includes a file access program 201, and a calendar program 202.

The file server system 103 includes a file server program 211, and a file access logging program 212.

The storage system 105 includes file data 221, file access log data 222, and backup data 223 being a backup of the file data 221.

The file access information management system 106 runs a file access log processing program 231, and creates file access data 232. The file access information management system 106 also runs a file access grouping program 233, and creates file access group data 234.

The file access information management system 106 also runs a web access log processing program 235, and creates web access data 236. The file access information management system 106 also runs a web access grouping program 237, and creates web access group data 238.

The file access information management system 106 also includes a backup program 213.

Note here that the programs in the file access information management system 106, i.e., the file access log processing program 231, the file access grouping program 233, the backup program 213, the web access log processing program 235, and the web access grouping program 237, may be included in the file server system 103. If this is the case, the storage system 105 includes the file access data 232, the file access group data 234, the web access data 236, and the web access group data 238.

When the file server system 103 includes the file access log processing program 231 and the file access grouping program 233, these programs may be included in the file system of the file server system 103.

The calendar server system 107 runs a calendar data generating program 241, and generates calendar data 242.

The web proxy server system 108 includes a web proxy server program 251 and a web access logging program 252. The web proxy server system 108 also includes web access log data 253.

Figure 3:
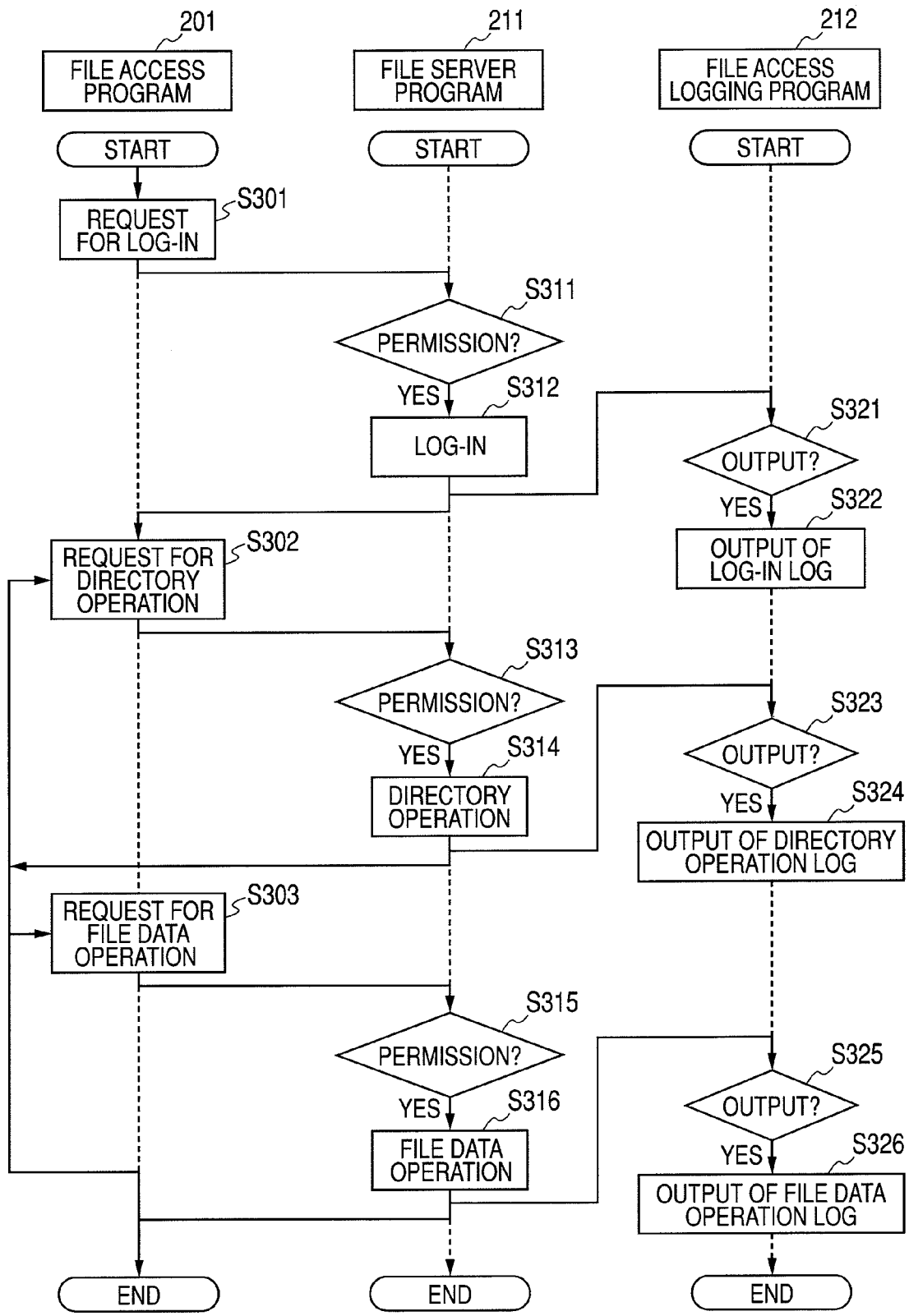
FIG. 3 is a flowchart of a file data operation log process in the first embodiment of the invention.

FIG. 3 is a flowchart of a file data operation log process in the first embodiment of the invention.

FIG. 3 shows the process for the client computer 101 to access the file data 221 stored in the storage system 105 by running the file access program 201 through the file access service provided by the file server program 211 in the file server system 103.

FIG. 3 also shows the process for the file server system 103 to create the file access log data 222 by running the file access logging program 212 at the time of accessing the file data 221 from the file access program 201. Note that log data 400 of FIG. 4 is an example of the file access log data 222 created by the file access logging program 212.

Figure 4:
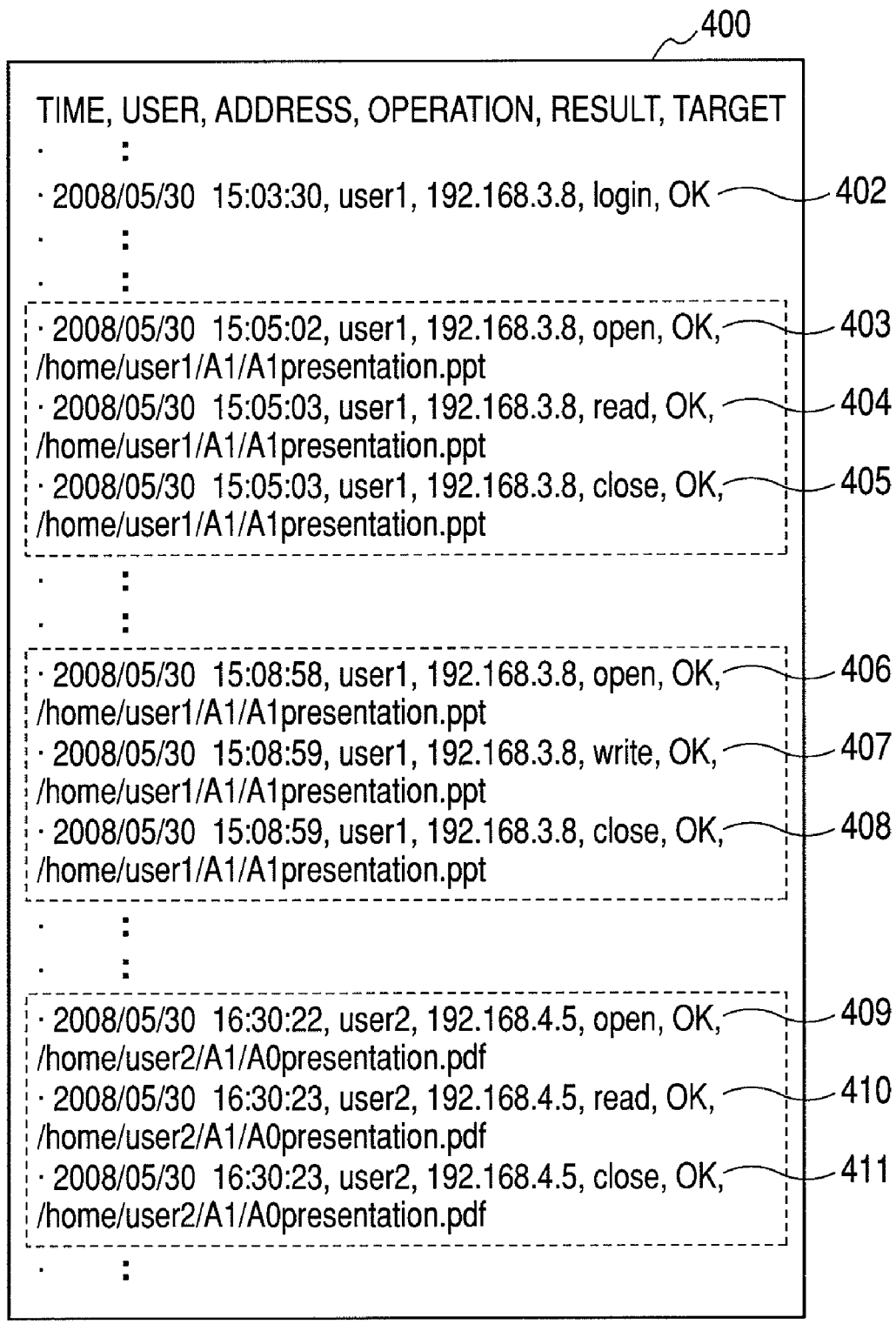
FIG. 4 is a diagram illustrating file access log data in the first embodiment of the invention.

FIG. 4 is a diagram illustrating the file access log data 222 in the first embodiment of the invention.

A user runs the file access program 201 from the client computer 101, and accesses the file data 221 in the storage system 105 through the file access service provided by the file server program 211 in the file server system 103.

The file access program 201 is exemplified by a CIFS client program, an NFS client program, or a WebDAV (Directorate of Advertising and Visual Publicity) client program. The file server program 211 is exemplified by a CIFS server program, an NFS server program, or a WebDAV server program.

The file data 221 is data on the file system of the client computer 101. The file data 221 is the data created by the client computer 101 using an application program such as document processing program.

First of all, the user starts the file access program 201. The file access program 201 makes a log-in request to the file server program 211 (S301). The file access program 201 outputs a screen asking the user to input a user name and a password, and the user accordingly makes inputs of the user name and the password. The file access program 201 forwards the user name and the password input by the user as such to the file server program 211, and makes a request for a log-in process.

The file server program 211 goes through an authentication process using the provided user name and password, and determines whether or not to allow the log-in to the file server system 103 (S311).

As a result of the authentication process, when determining to allow the log-in, the file server program 211 accordingly goes through the log-in process, and to the file access program 201, forwards a message of allowing the log-in (S312). The file access program 201 mounts a directory on a part of the file system of the client computer 101. The directory here is the one for provision to the file access program 201 by the file server program 211, i.e., a part of the storage area defined on the logical volume(s) 126 of the storage system 105. The file server program 211 also forwards, to the file access logging program 212, information about the log-in-allowed user name and the IP address of the client computer 101, for example.

When determining not to allow the log-in request, the file server program 211 forwards an error message to the file access program 201. Upon reception of the error message, the file access program 201 forwards the error message to the user, and ends the process with respect to the file server program 211.

After the file server program 211 executes the log-in process, the file access logging program 212 determines whether or not to output a log-in log to the file access log data 222. This determination is made based on information about the log-in-allowed user name, the IP address on the side of the client computer 101, and others (S321).

When determining to output the log-in log to the file access log data 222, the file access logging program 212 outputs various information found in a log-in operation log 402 of the log data 400 to the file access log data 222 (S322). The log-in operation log 402 includes the time of "2008/05/30 15:03:30", the user name of "user1", the IP address on the side of the client computer of "192.168.3.8", the operation of "login", and the result of "OK", for example.

The file access program 201 then makes a request to the file server program 211 for a directory operation (S302). The directory operation includes creation of directory, opening of directory, acquisition of directory details, and closing of directory, for example.

The file server program 211 then determines whether or not to allow such a directory operation to the file access program 201 (S313). This determination is made based on the user's privilege and directory permission, for example.

When determining to allow the directory operation, the file server program 211 performs the directory operation requested by the file access program 201, and forwards a message telling the result of the directory operation to the file access program 201 (S314).

When determining not to allow the directory operation, the file server program 211 forwards an error message to the file access program 201.

After the file server program 211 performing the directory operation, similarly to the process of S321, the file access logging program 212 determines whether or not to output the log about the directory operation to the file access log data 222 (S323). This determination is made based on information about time, user name, IP address of the client computer 101, operation details, operation result, name of directory being the operation target, and others.

When the file access logging program 212 outputs the entire log about the directory operation to the file access log data 222, the amount of the file access log data 222 is increased. Therefore, alternatively, the file access logging program 212 may output, to the file access log data 222, only any specific operation with respect to any specific directory that is defined in advance. Still alternatively, the file access logging program 212 may not output any directory operation to the file access log data 222.

When determining to output the log about the directory operation to the file access log data 222, the file access logging program 212 outputs various types of information to the file access log data 222 (S324). The various types of information includes time, user name, IP address of the client computer 101, operation details, operation result, name of directory being the operation target, and others.

Thereafter, the file access program 201 may go through a file data 221 operation request process (S303), or the directory operation request process (S302) again. Alternatively, the file access program 201 may end the process with respect to the file server program 211.

The file access program 201 then makes a request for the file server program 211 to operate the file data 221 (S303). The operation with respect to the file data 221 includes "open" for opening of file, "read" for reading of file, "write" for writing of file, and "close" for closing of file, for example.

The file server program 211 then determines whether or not to allow the file access program 201 to operate the file data 221 (S315). This determination is made based on the user's privilege, permission for the file data 221, permission for directory with which the file data 221 is created, and others.

When determining to allow the operation of the file data 221, the file server program 211 performs the operation of the file data 221 asked by the file access program 201, and forwards, to the file access program 201, a message telling the operation result of the file data 221 (S316).

When determining not to allow the operation of the file data 221, the file server program 211 forwards an error message to the file access program 201.

When the file server program 211 performs the operation of the file data 221, similarly to the process of S323, the file access logging program 212 determines whether or not to output the result of operating the file data 221 to the file access log data 222 (S325). This determination is made based on various information including time, user name, IP address of the client computer 101, operation details, operation result, name of directory being the operation target, and others.

When the file access logging program 212 outputs the entire log of operating the file data 221 to the file access log data 222, the amount of the file access log data 222 is increased. Therefore, alternatively, the file access logging program 212 may output, to the file access log data 222, only any specific operation with respect to the file data 222 in any specific directory that is defined in advance.

When determining to output the log of operating the file data 221 to the file access log data 222, the file access logging program 212 outputs information found in an "open" operation log 403 of the log data 400 to the file access log data 222 (S326).

The "open" operation log 403 includes the time of "2008/05/30 15:05:02", the user name of "user1", the IP address on the side of the client computer of "192.168.3.8", the operation of "open", the result of "OK", and the name of target file data 221 of "/home/user1/A1/A1presentation.ppt".

In S325, the file access logging program 212 determines the operation with respect to the file data 221 by capturing an operation command from the file access program 201 to the file server program 211.

Alternatively, the file access logging program 212 may determine the output to the file data 221 by referring to time stamp information of the file data 221 found in the file system of the file server system 103. The time stamp information includes the last attribute update time, the last file update time, and the last reference time.

Alternatively, the file access logging program 212 may determine the output to the file data 221 by checking the I/O process from the file server system 103 to the storage system 105. The I/O process includes data reading and writing.

Thereafter, the file access program 201 may go through the file operation request process (S303) again, or the directory operation request process (S302). Alternatively, the file access program 201 may end the process with respect to the file server program 211.

By referring to FIGS. 4 and 5, described next is a process for the file access information management system 106 to create the file access data 232 from the file access log data 222 by running the file access log processing program 231.

Described also is a process for the file access information management system 106 to create the backup data 223 by running the backup program 213 when the file access program 201 updates the file data 221.

FIG. 5 is a diagram illustrating a management table 500 of the file access data 232 in the first embodiment of the invention.

The file access information management system 106 runs the file access log processing program 231, and creates the file access data 232 from the file access log data 222. The program is run based on a processing activation trigger when the file close operation of "close" is output to the file access log data 222, for example.

Alternatively, the file access information management system 106 runs the file access log processing program 231 at regular intervals, e.g., frequency of once a few minutes, thereby creating the file access data 232 from the file access log data 222.

As described above, the file access log data 222 is the data created by the file access logging program 212 of the file server system 103. The file access log data 222 is the data exemplified by the log data 400. The file access log data 222 is defined by maximum size in advance, and when the data exceeds the maximum size, the data may be automatically deleted in order of date.

On the other hand, the file access data 232 is managed by the management table 500, and is created for management and use of the file access log data 222.

The management table 500 of the file access data 232 includes elements of "file access ID 501", "operation start time 502", "operation end time 503", "file 504", "user 505", "group 601", "IP address 602", "operation 603", and "backup 604".

The element of "file access ID 501" indicates values uniquely defined by the file access log processing program 231 with respect to the respective data.

The file access log processing program 231 puts a series of operation logs in a set, and forwards the resulting set as a piece of the file access data 232 to the log data 400. The operation logs are those output to the file access log data 222 by the same user from the same IP address with respect to the same file data 221, i.e., from "open" to "close" via "read" and "write".

Note here that only any set of operation logs showing success ("OK") to all of the operations is the target for the file access log processing program 231.

As to the elements in the log data 400 of FIG. 4 example, i.e., the "open" operation log 403, a "read" operation log 404, and a "close" operation log 405, the file access log processing program 231 creates a line in the file access data 232 in the management table 500 of FIG. 5 example as follows:

the "open" operation log 403: time "2008/05/30 15:05:02", user name "user1", IP address on the side of the client computer "192.168.3.8", operation "open", result "OK", name of the target file data 221 "/home/user1/A1/A1presentation.ppt", the "read" operation log 404: time "2008/05/30 15:05:03", user name "user1", IP address on the side of the client computer "192.168.3.8", operation "read", result "OK", name of the target file data 221 "/home/user1/A1/A1presentation.ppt", and the "close" operation log 405: time "2008/05/30 15:05:03", user name "user1", IP address on the side of the client computer "192.168.3.8", operation "close", result "OK", name of the target file data 221 "/home/user1/A1/A1presentation.ppt".

Described now is an exemplary case where the file access log processing program 231 creates a line 511 for the file access data 232 exemplarily shown in the management table 500. Herein, the "read" operation log 404 and the "close" operation log 405 share the same user ("user1"), the same IP address ("192.168.3.8"), and the same file data 221 ("/home/user1/A1/A1presentation.ppt").

The file access log processing program 231 makes an input of, to the element of "operation start time 502 in the line 511 of the management table 500, i.e., to 531, the time of the "open" operation log 403, i.e., "2008/05/30 15:05:02".

The file access log processing program 231 makes an input of, to the element of "operation end time 503" in the line 511 of the management table 500, i.e., to 532, the time of the "close" operation log 405, i.e., "2008/05/30 15:05:03".

The file access log processing program 231 makes an input of, to the element of "file 504" in the line 511 of the management table 500, i.e., to 533, the name of a target file for the "open" operation log 403, the "read" operation log 404, and the "close" operation log 405, i.e., "/home/user1/A1/A1presentation.ppt".

The file access log processing program 231 makes an input of, to the element of "user 505" in the line 511 of the management table 500, i.e., to 534, the name of a user for the "open" operation log 403, the "read" operation log 404, and the "close" operation log 405, i.e., "user1".

The file access log processing program 231 makes a search of information in the file server system 103 to find the name of a group corresponding to the user name of "user1", i.e., "group1". Thus found name of the group is input to the element of "group 601" in the line 511 of the management table 500, i.e., to 535.

The file access log processing program 231 makes an input of, to the element of "IP address 602" in the line 511 of the management table 500, i.e., to 536, the IP address for the "open" operation log 403, the "read" operation log 404, and the "close" operation log 405, i.e., "192.168.3.8".

The file access log processing program 231 makes an input of, to the element of "operation 603" in the line 511 of the management table 500, i.e., to 537, the operation log from the "read" operation log 404 with respect to the file data 221, i.e., "read".

In the file access log data 222, when there are a plurality of operation logs of "read" or a plurality of operation logs of "write" in the duration from the "open" operation log to the "close" operation log, the file access log processing program 231 may make an input to the element of "operation 603", i.e., to 537, together with the respective numbers. For example, when the file access log data 222 is logged with two of the "read" operation log, and three of the "write" operation log in the duration from the "open" operation log to the "close" operation log, the file access processing log program 231 may make an input of "read: 2, write: 3" to the element of "operation 603", i.e., to 537.

Alternatively, when the file data 221 includes only the "read" operation log in the duration from the "open" operation log to the "close" operation log, the file access log processing program 231 may make an input of "read" to the element of "operation 603", i.e., to 537. When the file data 221 includes even at least one "write" operation log in the duration from the "open" operation log to the "close" operation log, the file access log processing program 231 may make an input of "write" thereto. This is because if there is at least one write operation, with the process that will be described later, the file access data 232 comes with the backup data 223.

When the file access log data 222 is logged with a file "write" operation, the file access log processing program 231 makes an input of link information to the element of "backup 604", i.e., to 538, in the line 511 of the management table 500. The link information is about linkage to the backup data 223 created by the backup program 213. When the file access log data 222 is logged with only a file "read" operation, it means that the backup data 223 is not created so that the file access log processing program 231 makes no input to the element of "backup 604", i.e., to 538.

Similarly, described below are the processing details when the file access log processing program 231 creates the file access data 232 in a line of 515 of the management table 500 with an operation log set in the log data 400 of FIG. 4 example, i.e., an "open" operation log 406, a "write" operation log 407, and a "close" operation log 408.

When the log data 400 is provided with successive outputs of the "write" operation log 407, and the "close" operation log 408, the backup program 213 creates the backup data 223 with respect to the file data 221 being the operation target found in the operation log.

Note that the target for creation of the backup data 223 may be limited to the file data 221 in any specific directory under any specific previously-defined user.

When determining to create the backup data 223, the backup program 213 creates the backup data 223 based on a designation rule that is defined in advance to any directory designated in advance. For example, the backup program 213 creates the backup data 223 of "/home/user1/backup/A1/A1presentation_20080530_150859.ppt" with respect to the operation-target file data 221 of "/home/user1/A1/A1presentation.ppt".

When the log data 400 is written with the file "write" operation, the file access logging program 231 makes an input of, to the element of "backup 604", i.e., to "541", in the line 515 of the management table 500, the link information to the backup data 223 created by the backup program 213, i.e., "/home/user1/backup/A1/A1presentation_20080530_150859.ppt".

Similarly, a line 516 of the management table 500 indicates the file access data 232 created by the file access log processing program 231 with a set of an "open" operation log 409, a "read" operation log 410, and a "close" operation log 411 in the log data 400 of FIG. 4 example.

By referring to FIGS. 5 to 9, described next is a process for the file access information management system 106 to create the file access group data 234 from the file access data 232 by running the file access grouping program 233.

The file access group data 234 is the data as a result of grouping the file access data 232 with respect to the same file data 221.

The file access information management system 106 runs the file access grouping program 233, and creates the file access group data 234 from the file access data 232. The program is run based on a processing activation trigger when the file access data 232 of a fixed amount is created, for example.

Alternatively, the file access information management system 106 may run the file access grouping program 233 at regular intervals, e.g., frequency of once an hour, thereby creating the file access group data 234 from the file access data 232.

For creating the file access group data 234 from the file access data 232, first of all, the file access grouping program 233 creates a management table showing the correlation among the file access data 232. The access grouping program 233 then integrates any of the file access data 232 related with one another to a group of file access data (the file access group data 234).

FIG. 6A is a diagram illustrating a management table before grouping of the file access data in the first embodiment of the invention.

FIG. 6B is a diagram illustrating a management table of the file access group data in the first embodiment of the invention.

FIG. 6C is a diagram illustrating a management table including an element of "degree of relevance" for the file access group data in the first embodiment of the invention.

A management table 701 of FIG. 6A exemplarily shows the correlation among the file access data 232. A management table 702 of FIG. 6B is an exemplary management table showing the file access group data 234.

The management table 701 includes elements of "file access ID 711", "previous file access ID 712", and "next file access ID 713". The elements of "file access ID 711", "previous file access ID 712", and "next file access ID 713" are the same as the element of "file access ID 501" of the management table 500 of FIG. 5.

Figure 7:
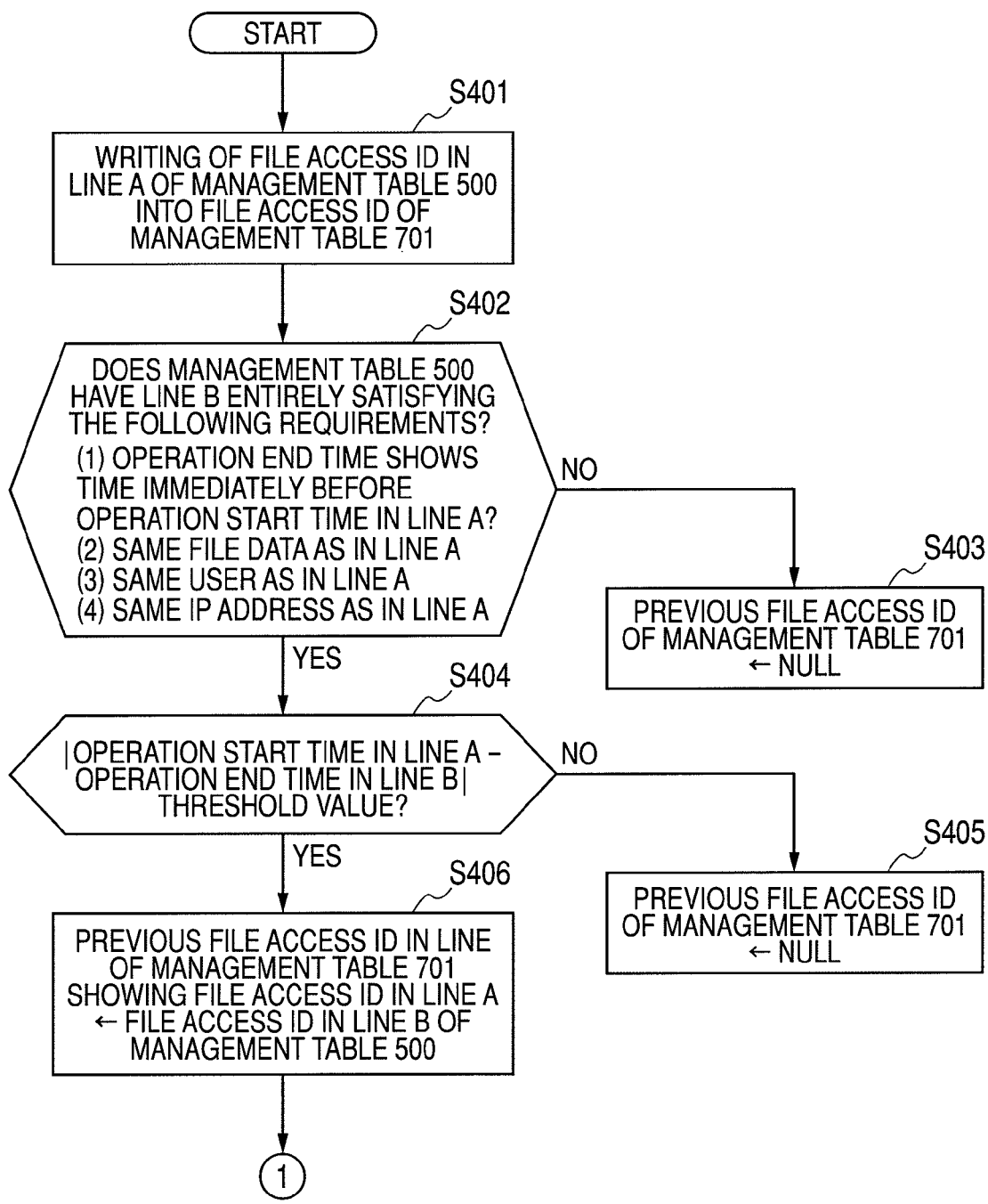
FIG. 7 is a flowchart of a process of grouping the file access data in the first embodiment of the invention.

FIG. 7 is a flowchart of a process of grouping the file access data 232 in the first embodiment of the invention.

As an example, described are the line 511 of the management table 500 and a line 721 of the management table 701 corresponding thereto.

The file access grouping program 233 makes an input of, to the element of "file access ID 711" in the line 721 of the management table 701, a value "101" same as that in the element of "file access ID 501" in the line 511 (line A) of FIG. 5 (S401).

For the file access data 232 in the line A of the management table 500, the file access grouping program 233 selects any of the file access data 232 (line B) showing the same user as in the element 534, i.e., "user1", the same IP address as in the element 536, i.e., "192.168.3.8", and the same file as in the element 533, i.e., "/home/user1/A1/A1presentation.ppt", and showing, in the element of "operation end time 503", the time immediately before the time in the element of "operation start time 502" (S402). Because there is no file access data 232 in the line 511 of the management table 500 satisfying such requirements, the file access grouping program 233 makes an input of "NULL" to the element of "previous file access ID 712" in the line 721 of the management table 701 (S403).

When the line B satisfying the requirements is selected in S402, the file access grouping program 233 determines whether or not a difference between the value in the element of "operation end time 503" in the line B and the value in the element of "operation start time 531" in the line A is a predetermined threshold value or smaller (S404). When the value difference is the threshold value or smaller, the file access grouping program 233 inputs the value in the element of "file access ID 501" in the line B to the element of "previous file access ID 712" in the line 721 of the management table 701 (S406). On the other hand, when the value difference is larger than the threshold value, it means that there is no file access data 232 satisfying the requirements. The file access grouping program 233 thus inputs "NULL" to the element of "previous file access ID 712" in the line 721 of the management table 701 (S405).

Figure 8:
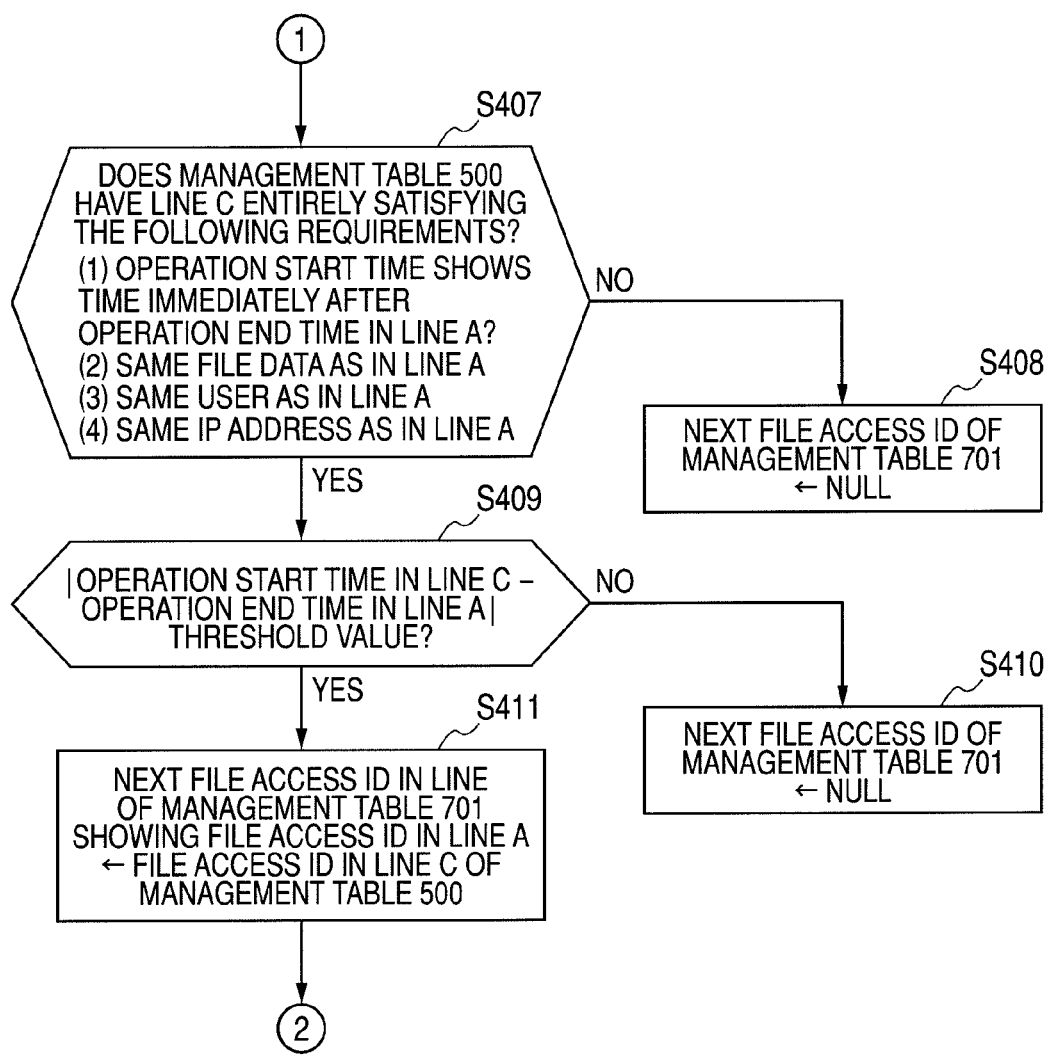
FIG. 8 is another flowchart of the process of grouping the file access data in the first embodiment of the invention.

FIG. 8 is also a flowchart of the process of grouping the file access data 232 in the first embodiment of the invention, i.e., continuation from the flowchart of FIG. 7.

For the line A, the file access grouping program 233 then selects any of the file access data 232 (line C) showing the same user ("user1"), the same IP address ("192.168.3.8"), and the same file ("/home/user1/A1/A1presentation.ppt"), and showing, in the element of "operation start time", the time immediately after the time in the element of "operation end time 503" (S407). In FIG. 5 example, a line 512 showing "102" in the element of "file access ID" corresponds to the line C. When there is no line C satisfying the requirements, the file access grouping program 233 inputs "NULL" to the element of "next file access ID 713" in the line 721 of the management table 701 (S408).

When the line C satisfying the requirements is selected in S407, the file access grouping program 233 determines whether a difference between the value in the element of "operation start time 502" in the line C and the value in the element of "operation end time 503" in the line A is the predetermined threshold value or smaller (S409). When determining that the value difference is the threshold value or smaller, the file access grouping program 233 inputs the value "102" in the element of "file access ID 501" in the line C to the element of "next file access ID 713" (S411). On the other hand, when determining that the value difference is larger than the threshold value, the file access grouping program 233 inputs "NULL" to the element of "next file access ID 713" (S410).

Similarly, described are the line 512 of the management table 500 and a line 722 of the management table 701 corresponding thereto.

The file access grouping program 233 makes an input of, to the element of "file access ID 711" in the line 721 of the management table 701, a value "102" same as that in the element of "file access ID 501" in the line 512 of FIG. 5 (S401).

For the line 512 of the management table 500, the file access grouping program 233 selects any of the file access data 232 showing the same user ("user1"), the same IP address ("192.168.3.8"), and the same file ("/home/user1/A1/A1presentation.ppt"), and showing, in the element of "operation end time 503", the time immediately before the time in the element of "operation start time 502". In this example, selected is the line 511.

The file access grouping program 233 then determines that a difference of time is equal to or smaller than the predetermined threshold value, i.e., a difference between the value in the element of "operation end time 503" in the line 511 of the management table 500, i.e., "2008/05/30 15:05:03", and the value in the element of "operation start time 502" in the line 512 thereof, i.e., "2008/05/30 15:05:55". The file access grouping program 233 thus inputs a value "101" found in the element of "file access ID 501" in the line 511 to the element of "previous file access ID 712".

Next, for the line 512 of the management table 500, the file access grouping program 233 selects any of the file access data 232 showing the same user ("user1"), the same IP address ("192.168.3.8"), and the same file ("/home/user1/A1/A1presentation.ppt"), and showing, in the element of "operation start time 502", the time immediately after the time in the element of "operation end time 503". In this example, selected is a line 513.

The file access grouping program 233 then determines that a difference of time is equal to or smaller than the predetermined threshold value, i.e., a difference between the value in the element of "operation start time 502" in the line 513 of the management table 500, i.e., "2008/05/30 15:06:30", and the value in the element of "operation end time 503" in the line 512 thereof, i.e., "2008/05/30 15:05:56". The file access grouping program 233 thus inputs a value "103" found in the element of "file access ID 501" in the line 513 to the element of "next file access ID 713".

Similarly, for a line 723 of the management table 701, the file access grouping program 233 makes an input of, to the element of "file access ID" showing "103" of the line 513, a value "102" being the file access ID satisfying the requirements for the element of "previous file access ID 712", and a value "105" being the file access ID satisfying the requirements for the element of "next file access ID 713".

Thereafter, the process is similarly executed so that the file access grouping program 233 creates the management table 701.

The file access grouping program 233 then creates the management table 702 from the management table 701, thereby creating the file access group data 234.

After the creation of the management table 701, the file access grouping program 233 then creates the management table 702.

The management table 702 includes elements of "file access group ID 731", "start file access ID 732", and "end file access ID 733". In the management table 702 of FIG. 6B, the elements of "start file access ID 732" and "end file access ID 733" are the same as the element of "file access ID" in the management table 500.

Each line in the management table 702 indicates a piece of file access group data 234. To the element of "file access group ID 731", the file access grouping program 233 makes an input of unique value defined to each of the file access group data 234.

Figure 9:
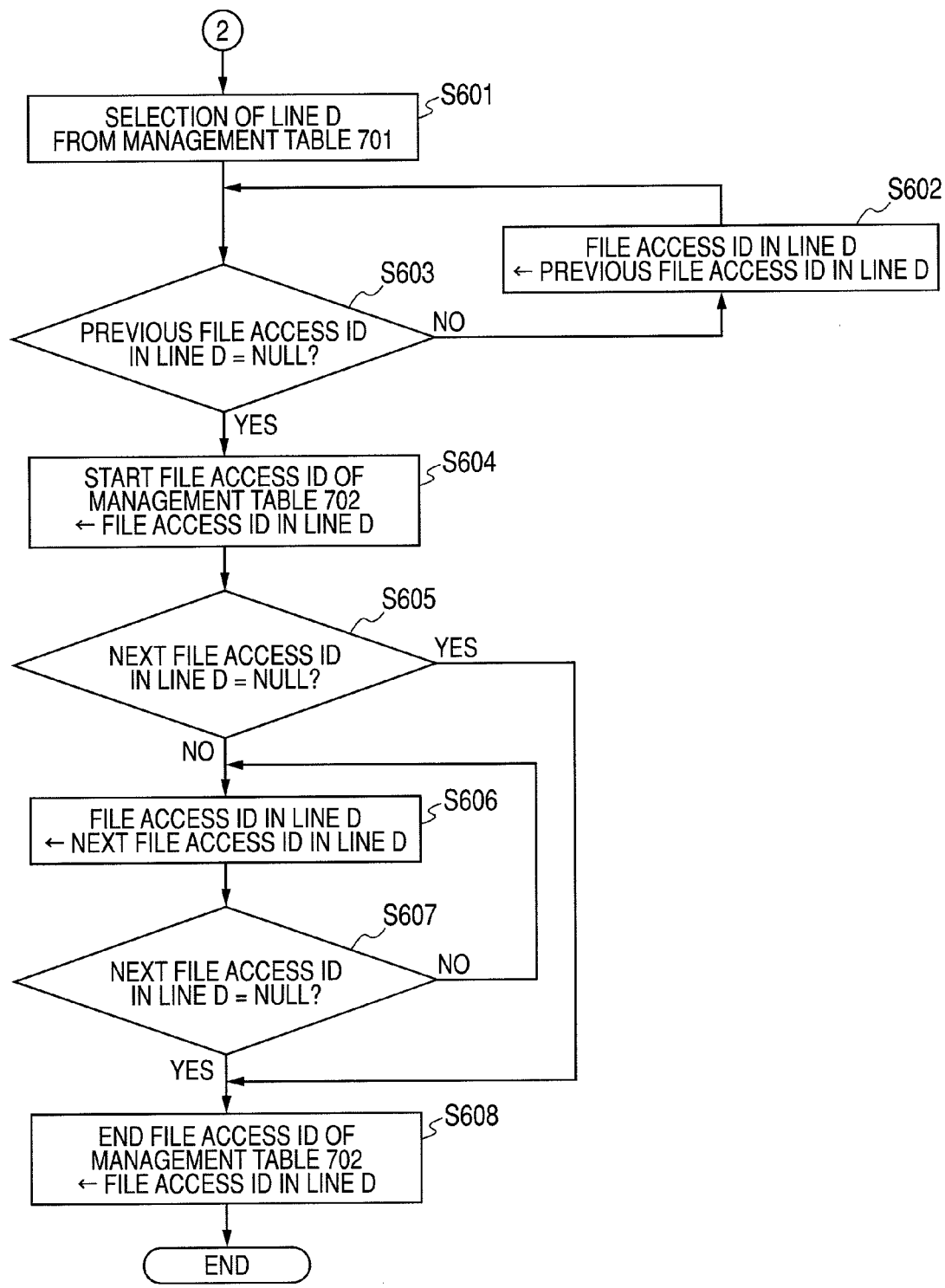
FIG. 9 is a flowchart of a process of creating the file access group data in the first embodiment of the invention.

FIG. 9 is a flowchart of a process of creating the file access group data 234 in the first embodiment of the invention.

From the management table 701, the file access grouping program 233 selects any line showing "NULL" in the element of "previous file access ID 712", i.e., line D in this example (S601 to S603). The file access grouping program 233 then inputs the value in the element of "file access ID 711" in the line D to the element of "start file access ID 732" of the management table 702 (S604).

For example, from the management table 701, the file access grouping program 233 selects the line 721 showing "NULL" in the element of "previous file access ID 712", and inputs a value "101" being the value in the element of "file access ID 711" in the line 721 to the element of "start file access ID 732" in a line 741 of the management table 702.

The file access grouping program 233 then determines whether or not the element of "next file access ID" shows "NULL" in the line D of the management table 701 (S605). When determining that the value is "NULL", the file access grouping program 233 inputs the value in the element of "file access ID 711" in the line D to the element of "end file access ID 733" in the corresponding line of the management table 702 (S608).

When determining that the value is not "NULL", the file access grouping program 233 searches the element of "file access ID 711" to find the value in the element of "next file access ID 713" in the line D, and selects the next line D (S606) In FIG. 7 example, the file access grouping program 233 searches the element of "file access ID 711" to find a value "102" in the element of "next file access ID 713" in the line 721 of the management table 701. The file access grouping program 233 thus selects the line 722.

Next, the file access grouping program 233 determines whether or not the value is "NULL" in the element of "next file access ID 713" in the line D (S607). When the value is determined as not "NULL", the procedure repeats S606 and S607.

In FIG. 6A example, the file access grouping program 233 searches the element of "file access ID 711" to find a value "103" being the value in the element of "next file access ID 713" in the line 722 of the management table 701, and selects the line 723.

Thereafter, the procedure repeats the process similar thereto, and the file access grouping program 233 selects a line 728 showing "NULL" in the element of "next file access ID 713".

The file access grouping program 233 then makes an input of, to the element of "end file access ID 733" in the corresponding line of the management table 702, the value in the element of "file access ID 711" in the line D showing the value of "NULL" in the element of "next file access ID 713" (S608).

In FIG. 6A example, because the element of "next file access ID 713" in the line 728 of the management table 701 shows the value of "NULL", the file access grouping program 233 inputs a value "131" being the value in the element of "file access ID 711" in the line 728 to the element of "end file access ID 733" in the line 741 of the management table 702.

With such a process, the file access group data 234 indicated by the value "1001" in the element of "file access group ID 731" in the line 741 of the management table 702 (hereinafter, referred to as file access group data "1001" 741) is a collection of the file access data 232 being a succession of the line 721 of the management table 701, the file access data "101" 511 (the line 511 of the management table 500), the line 722 of the management table 701, the file access data "102" 512 (the line 512 of the management table 500), the line 723 of the management table 701, the file access data "103" 513 (the line 513 of the management table 500), a line 725 of the management table 701, the file access data "105" 515 (the line 515 of the management table 500), and a line 728 of the management table 701, the file access data "131" 518 (a line 518 of the management table 500).

Similarly, the file access group data "1002" 742 in a line 742 of the management table 702 is a collection of the file access data 232 being a succession of a line 724 of the management table 701, the file access data "104" 514 (a line 514 of the management table 500), . . . , and a line 727 of the management table 701, the file access data "121" 517 (a line 517 of the management table 500).

Similarly, the file access group data "1003" 743 in a line 743 of the management table 702 is a line 726 of the management table 701, the file access data "111" 516 (a line 516 of the management table 500).

The file access grouping program 233 is defined in advance with a threshold value for defining the correlation between the file access data 232 being a target in the management table 701 and the file access data 232 immediately therebefore, and the correlation between the target file access data 232 and the file access data 232 immediately thereafter. Such a threshold value is determined in consideration of the behavior of the application program on the client computer 101 related to a disk I/O, and the user's use tendency of the application program.

The file access grouping program 233 may delete any of the file access group data 234 in the management table 702 showing the short user's operation time from data display of the management table 702 or from the management table 702.

That is, for the file access group data 234 of the management table 702, when a difference of time is the predetermined threshold value or smaller, the file access grouping program 233 may delete the file access group data 234 of the management table 702 from data display of the management table 702 or from the management table 702. The difference of time here is the one between the value in the element of "operation start time 502" of the file access data 232 showing the value in the element of "start file access ID 732" to the value in the element of "operation end time 503" of the file access data 232 indicated by the value in the element of "end file access ID 733".

In FIG. 6B example, in the management table 702, on the line 743, a strikeout line 751 is drawn therethrough. This indicates that the file access grouping program 233 deletes the file access group data 743 from data display of the management table 702 or from the management table 702.

Next, by referring to the management table 703 of FIG. 6C, described is a process for the file access grouping program 233 to calculate the degree of relevance between the file access group data 234.

When the file access group data 234 of a fixed amount is created, for example, the file access information management system 106 runs the file access grouping program 233 based on a specific process activation trigger, and creates the management table 703 from the management table 702 carrying the file access group data 234 for calculation of the degree of relevance between the file access group data 234.

Alternatively, the file access information management system 106 runs the file access grouping program 233 at regular intervals, e.g., frequency of once an hour, and creates the management table 703 from the management table 702 carrying the file access group data 234 for calculation of the degree of relevance between the file access group data 234.

The management table 703 includes elements of "file access group ID 761", "related file access group ID 762", and "degree of relevance 763". In the management table 703, the elements of "file access group ID 761" and "related file access group ID 762" are the same as the element of "file access group ID 731" of the management table 702.

As an example, described is a line 771 of the management table 703.

The element of "file access group ID 761" indicates values uniquely assigned to the file access group data 234, respectively, i.e., values input to the element of "file access group ID 731" in the management table 702. In this example, the file access grouping program 233 makes an input of a value "1001" to the element of "file access group ID 761" of the management table 703.

The file access grouping program 233 acquires the operation time, the user, the group, and the IP address of the file access group data "1001" 741 in the following manners.

The file access grouping program 233 makes a search of the operation time of the file access group data "1001" 741. The operation time of the file access group data 234 is the time, in the management table 702, from the time found in the element of "operation start time 502" of the file access data 232 indicated by the value in the element of "start file access ID 732" of the file access group data 234 to the time found in the element of "operation end time 503" of the file access data 232 indicated by the value in the element of "end file access ID 733".

The file access grouping program 233 acquires the operation start time of the file access group data "1001" 741, i.e., the value in the element of "operation start time 502", i.e., "2008/05/30 15:05:02" (the line 511 of the management table 500, the operation start time 502) of the file access data 232 indicated by "101" being the value in the element of "start file access ID 732" in the line 741 of the management table 702. Hereinafter, such data is referred to as start file access data "101" 511. This is also applicable to below.

Similarly, as the operation end time of the file access group data "1001" 741, the file access grouping program 233 acquires the value in the element of "operation end time 503" of the file access group data 232 indicated by "131" being the value in the element of "end file access ID 733" in the line 741, i.e., "2008/05/30 16:48:16" (line 518 of the management table 500, the operation end time 503). Hereinafter, such data is referred to as end file access data "131" 518. This is also applicable to below.

The file access grouping program 233 acquires, for the user in the line 741 of the management table 702, the value in the element of "user 505" shared by the group of the file access data 232 from the start file access data "101" 511 to the end file access data "131" 518, i.e., "user1" (the value in the element of "user 505" in the lines 511, 512, 513, 515, and 518 of the management table 500).

The file access grouping program 233 acquires, for the group in the line 741 of the management table 702, the value in the element of "group 601" for the shared use in the line 741, i.e., "group1" (the value in the element of "group 601" in the lines 511, 512, 513, 515, . . . , and 518 of the management table 500).

The file access grouping program 233 acquires, for the IP address in the line 741 of the management table 702, the value in the element of "IP address 602" for the shared use in the line 741, i.e., "192.168.3.8" (the value in the element of "IP address 602" in the lines 511, 512, 513, 515, . . . , and 518 of the management table 500).

The file access grouping program 233 makes an input of, to the element of "related file access group ID 762" in the line 771, the value in the element of "file access group ID 731" in any other file access group data 234 satisfying the following requirements:

Requirements 1: the same user as the user "user1" in the line 741,

Requirements 2: the same IP address "192.168.3.8" as the IP address in the line 741, Requirements 3: any overlap of operation time with the operation time in the line 741, i.e., from the operation start time of "2008/05/30 15:05:02" to the operation end time of "2008/05/30 16:48:16.

As to the above requirements, the requirements 2 of the IP address may not be necessarily met. This is because a user may access a plurality of file data 221 at the same time by using a plurality of client computers 101 at the same time.

Alternatively, the file access grouping program 233 may input the value in the element of "file access group ID 761" of any other file access group data 234 satisfying the following requirements to the element of "related file access group ID".

Requirements 1: the same group as the group "group1" in the line 741, and

Requirements 2: any overlap of operation time with the operation time in the line 741, i.e., from the operation start time of "2008/05/30 15:05:02" to the operation end time of "2008/05/30 16:48:16.

In FIGS. 6B and 6C examples, the file access grouping program 233 makes an input of, to the element of "related file access group ID 762" in the line 771, the value "1002" in the element of "file access group ID 731" in the line 742 of the management table 702 (user "user1", IP address "192.168.3.8", operation start time "2008/05/30 15:08:15", and operation end time "2008/05/30 16:33:16".

The file access grouping program 233 enters, into the element of "degree of relevance 763" in the line 771 of the management table 703, the degree of relevance between the file access group data "1001" 741 and any other file access group data "1002" 742 related thereto.

The file access grouping program 233 defines the degree of relevance by, for example, (overlap of operation time between the operation time of the file access group data "1001" 741 and the operation time of the file access group data "1002" 742)÷(the operation time of the file access group data "1001" 741). That is, ("2008/05/30 15:08:15" to "2008/05/30 16:33:16")÷("2008/05/30 15:05:02" to "2008/05/30 16:48:16")≅0.8, and the resulting value is input to the element of "degree of relevance 763".

Note here that, alternatively, the degree of relevance may be calculated based on a difference of time between the operation end time of one file data and the operation start time of another file data.

When there is still any other file access group data 234 satisfying the above requirements with respect to the file access group data "1001" 741, the file access grouping program 233 additionally provides a line to the management table for entry of the value thereof.

Note here that, in the management table 703 of FIG. 6C example, the file access group data "1003" 743 is not shown.

Similarly, described now is a line 772 of the management table 703. The file access grouping program 233 enters the value of the file access group data "1002" 742 to the element of "file access group ID 731", and enters the value of the file access group data "1001" 741 to the element of "related file access group ID 762".

The file access grouping program 233 makes an input of the calculation result into the element of "degree of relevance 763" in the line 772, i.e., "2008/05/30 15:08:15" to "2008/05/3016:33:16")÷("2008/05/3015:08:15" to "2008/05/30 16:33:16")≅1.0.

Described next is a process for the file access grouping program 233 to compress the file access data 232 using the file access group data 234.

The file access data 232 may be huge in amount as is including every access made to the file data 221. In consideration thereof, the user may compress the data at any arbitrary timing by using the file access group data 234.

The compression result of the file access data 232 under the management of the management table 500 using the file access group data 234 under the management of the management table 702 is the file access data 232 in a management table 800 of FIG. 8.

FIG. 10 is a diagram illustrating the management table 800 of the file access data 232 after compression in the first embodiment of the invention.

The management table 800 of the file access data 232 after compression includes columns same as those in the management table 500 of the file access data 232 not compressed. The management table 800 includes elements of "file access ID 810", "operation start time 811", "operation end time 812", "file 813", "user 814", "group 815", "IP address 816", "operation 817", and "backup 818".

The file access grouping program 233 creates a line of the management table 800 from a line of the management table 702, e.g., from the line 741 of the management table 702, the file access group data "1001" 741 includes the following file access data 232:

the file access data "101" 511 (the line 511 of the management table 500), the file access data "102" 512 (the line 512 of the management table 500), the file access data "103" 513 (the line 513 of the management table 500), the file access data "105" 515 (the line 515 of the management table 500), and the file access data "131" 518 (the line 518 of the management table 500). These file access data 232 are compressed by the file access grouping program 233 down to a piece of file access data 232, and the result is in a line 801 of the management table 800.

Described next is the line 801 of FIG. 10.

The file access grouping program 233 makes an input of, to the element of "file access ID 810" of the management table 800, the value of "101" in the element of "start file access ID 732" in the line 741 of the management table 702, i.e., the value in the element of "file access ID 501" of the management table 500.

The file access grouping program 233 makes an input of, to the element of "operation start time 811" of the management table 800, the value "2008/05/30 15:05:02" in the element of "operation start time 502" in the line 511 of the management table 500 showing, in the element of "file access ID 501", "101" being the value in the element of "start file access ID 732" in the line 741 of the management table 702.

The file access grouping program 233 makes an input of, to the element of "operation end time 812" of the management table 800, the value "2008/05/30 16:48:16" in the element of "operation end time 503" in the line 518 of the management table 500 showing, in the element of "file access ID 501", "131" being the value in the element of "end file access ID 733" in the line 741 of the management table 702.

The file access grouping program 233 makes an input of, to the element of "file 813" of the management table 800, the value "/home/user1/A1/A1presentation.ppt" in the element of "file 504" of the management table 500 same as the value in the line 741 of the management table 702, i.e., the value in the element of "file 504" in the lines 511, 512, 513, 515 518 of the management table 500. The line 741 here is the group of the file access data 232 from the start file access ID 732, i.e., "101", to the end file access ID 733, i.e., "131".

The file access grouping program 233 makes an input of, to the element of "user 814" of the management table 800, the value "user1" in the element of "user 505" same as that in the line 741 of the management table 702, i.e., the value in the element of "user 505" in the lines 511, 512, 513, 515 . . . , 518 of the management table 500.

The file access grouping program 233 makes an input of, to the element of "group 815" of the management table 800, the value "group1" in the element of "group 601" same as that in the line 741 of the management table 702, i.e., the value in the element of "group 601" in the lines 511, 512, 513, 515 . . . , 518 of the management table 500.

The file access grouping program 233 makes an input of, to the element of "IP address 816" of the management table 800, the value "192.168.3.8" in the element of "IP address 602" same as that in the line 741 of the management table 702, i.e., the value in the element of "IP address 602" in the lines 511, 512, 513, 515 . . . , 518 of the management table 500.

The file access grouping program 233 edits the value in the element of "operation 603" of each of the file access data 232 found in the line 741 of the management table 702, i.e., the value in the element of "operation 603" in the lines 511, 512, 513, 515 . . . , 518 of the management table 500, and inputs the resulting values to the element of "operation 817" of the management table 800. The file access grouping program 233 calculates how many of "read" and "write" are found in the element of "operation 603" in each of the file access data 232 in the line 741 of the management table 702, and inputs the resulting values to the element of "operation 603" of the management table 800. For example, when the element of "operation 603" includes 7 "read" and 20 "write", the file access grouping program 233 makes an input of "read: 7, write: 20".

Alternatively, when the values in the element of "operation 603" entirely show "read" for each of the file access data 232 in the line 741 of the management table 702, the file access grouping program 233 may enter "read", and when there is even at least one "write", the file access grouping program 233 may enter "write" in the element of "operation 603". This is because when the "write process" is executed even once, the file access group data 234 comes with the backup data 223.

The file access grouping program 233 edits the value in the element of "backup 604" of each of the file access data 232 found in the line 741 of the management table 702, i.e., the value in the element of "backup 604" in the lines 511, 512, 513, 515 ..., 518 of the management table 500, and inputs the resulting values to the element of "backup 818" of the management table 800.

When the value in the element of "backup 604" of each of the file access data 232 in the line 741 of the management table 702 includes link information to a plurality of backup data 223, the file access grouping program 233 makes an input of, to the element of "backup 818" of the management table 800, the link information to the latest backup data 223 of "/home/user1/backup/A1/A1presentation_20080530_164816.ppt".

Alternatively, the file access grouping program 233 may split a plurality of link information using ",", for example, and may input the link information to all of the backup data 223 to the element of "backup 818" of the management table 800.

Similarly, the file access grouping program 233 compresses the file access group data in the line 742 of the management table 702, and inputs a line 802 of the management table 800.

Similarly, the file access grouping program 233 compresses the file access group data in the line 743 of the management table 702, and inputs a line 803 of the management table 800.

In the below, similarly to the above, described is a process for the web access logging program 252 of the web proxy server system 108 to create the web access log data 253, for the web access log processing program 235 of the file access information management system 106 to create the web access data 236 from the web access log data 253, and for the web access grouping program 237 of the file access information management system 106 to create the web access group data 238 from the web access data 236.

Note here that any process similarly executed to derive the file access group data 234 from the file access log data 222 is not described twice, and only any difference is described.

By referring to FIG. 11, described is a process for the file access information management system 106 to create the web access data 236 from the web access log data 253 by running the web access log processing program 235.

FIG. 11 is a diagram illustrating a management table 900 of the web access data 236 in the first embodiment of the invention.

The process of creating the web access data 236 is executed similarly as the above-described process, i.e., the file access information management system 106 creates the file access data 232 from the file access log data 222 by running the file access log processing program 231.

The web access log data 253 is log data about accesses made by the client computer 101 to web pages provided by a web server on the Internet or intranet.

The web access log data 253 is similar to the file access log data 222 exemplified in the log data 400. As such, any operation and target for the file data 221 in the log data 400 may be replaced with operations with respect to the web pages and URLs (Uniform Resource Locators) thereof.

Similarly to the management table 500 of the file access data 232, the management table 900 of the web access data 236 includes elements of "web access ID 901", "operation start time 902", "operation end time 903", "URL 904", "user 905", "IP address 906", and "operation 907". In the management table 900, group columns are not shown.

The management table 900 of the web access data 236 does not include any data corresponding to the element of "backup 604" in the management table 500 of the file access data 232.

Unlike the management table 500 of the web access data 232, in the management table 900 of the web access data 236, the web access log processing program 235 inputs a URL of any accessed web page to the element of "URL 904". The web access log processing program 235 also makes an input of, to the element of "operation 907", a method such as "GET" and "POST" of an HTTP (HyperText Transfer Protocol", which is a typical protocol for transmission/reception of web pages, for example.

The lines in the management table 900 of the web access data 236 each correspond to a pair of request and response in the HTTP.

By referring to FIGS. 11 to 12C, described next is a process for the file access information management system 106 to create the web access group data 238 from the web access data 236 by running the web access grouping program 237.

FIG. 12A is a diagram illustrating a management table for use to be ready for grouping of the web access group data in the first embodiment of the invention.

FIG. 12B is a diagram illustrating a management table of the web access group data in the first embodiment of the invention.

FIG. 12C is a diagram illustrating a management table including an element of "degree of relevance" between the web access group data in the first embodiment of the invention.

The process of creating the web access group data 238 is executed similarly to the above-described process, i.e., the file access information management system 106 creates the file access group data 234 from the file access data 232 by running the file access grouping program 233.

A management table 1001 includes elements of "web access ID 1011", "previous web access ID 1012", and "next web access ID 1013". The element of "web access ID 1011" of the management table 1001 is the same as the element of "web access ID 901" of the management table 900.

The management table 1001 is similar to the management table 701. In the management table 1001, the relationship between the elements of "previous web access ID 1012" and "next web access ID 1013" with respect to the element of "web access ID 1011" is similar to the relationship between the elements of "previous file access ID 712" and "next file access ID 713" in the management table 701 with respect to the element of "file access ID 501".

Note here that, although the web access data 236 indicated by the element of "web access ID 1011" has to have the same user and the same IP address as the web access data 236 indicated by the element of "previous web access ID 1012", their URLs are not necessarily be entirely the same, and the first portion thereof being the same will do.

For example, in a line 1024 of the management table 1001, the web access grouping program 237 inputs a value "111" to the element of "web access ID 1011", and a value "112" to the element of "next web access ID 1013". This is because the following requirements are satisfied in the lines 914 and 915 of the management table 900:

the same user ("user1"),
the same IP address ("192.168.3.8"),
the value in the element of "URL 904" in the line 914, i.e., "http://url2/page1.html" and the value in the element of "URL 904" in the line 915, i.e., "http://url2/page2.html", have the same first half portion, i.e., "http://url2/", and a difference of time is a threshold value or smaller between the value in the element of "operation end time 903" in the line 914 with the element of "web access ID 901" showing "111", i.e., "2008/05/30 15:02:14", and the value in the element of "operation start time 902" in the line 915 with the element of "web access ID 901" showing "112", i.e., "2008/05/30 15:08:08".

Next, the web access grouping program 237 creates a management table 1002 from the management table 1001, thereby creating the web access group data 238.

The management table 1002 includes elements of "web access group ID 1031", "start web access ID 1032", and "end web access ID 1033".

The columns in the management table 1002 are provided with values by a process similarly executed as creating the management table 702 from the management table 701.

The web access group data 238 under the web access group ID of "1001" in a line 1041 of the management table 1002 (hereinafter, referred to as web access group data "1001" 1041, and this is also applicable to below) is a group of the web access data 236 being a succession of the line 1021 of the management table 1001, web access data "101" 911 (the line 911 of the management table 900), the line 1022 of the management table 1001, web access data "102" 912 (the line 912 of the management table 900), and the line 1023 of the management table 1001, web access data "103" 913 (the line 913 of the management table 900). This is applicable to the web access group data "1002" 1042 in the line 1042 of the management table 1002, and the web access group data "1003" 1043 in the line 1043 of the management table 1002.

Similarly to the process for the management table 702, as to the web access group data 238 in the management table 1002, the web access grouping program 237 may eliminate any of the web access group data 238 showing the short user's operation time from data display of the management table 1002 or from the management table 1002.

In FIG. 12B example, in the management table 1002, on a line 1043, a strikeout line 1052 is drawn therethrough. This indicates that the web access grouping program 237 deletes the web access group data "1003" 1043 from data display of the management table 1002 or from the management table 1002.

As to the web access group data 238 of the management table 1002, the web access grouping program 237 may delete any of the web access group data 238 including any specific URL such as a web page for search use from data display of the management table 1002 or from the management table 1002.

The reason of deleting the web access group data 238 including any specific URL is that a user may use a search page as any auxiliary means for reaching any target web page, and the web page for search use is not being the target.

As an example, in the management table 1002, on the line 1041, a strikeout line 1051 is drawn therethrough. This is because the web access group data "1001" 1041 includes "http://search/" being the value indicating the element of "URL 904" of a web page for search use, i.e., the value in the element of "URL 904" of each of the lines 911, 912, and 913 of the management table 900.

The process of compressing the web access data 236 using the management table 1002 of the web access group data 238 is executed similarly to the process of compressing the file access data 232 using the management table 702 of the file access group data 234.

Described next is a process of calculating a value for the element of "degree of relevance 1063" of the web access group data 238 with respect to the file access group data 234 using a management table 1003 of FIG. 12C.

The management table 1003 includes elements by "file access group ID 1061", "related web access group ID 1062", and "degree of relevance 1063".

The management table 1003 is created similarly by the process of creating the management table 703. The web access grouping program 237 makes an input of a value calculated as below to the element of "degree of relevance 1063" in a line 1071 of the management table 1003, for example.

(Any overlap of time between the operation time of the file access group data "1001" 741 and the operation time of the web access group data "1002" 1042)÷(the operation time of the file access group data "1001" 741)

That is, ("2008/05/30 15:05:02" to "2008/05/30 15:40:56")÷("2008/05/30 15:05:02" to "2008/05/30 16:48:16")≅0.3

The resulting value 0.3 is input to the element of "degree of relevance 1063" in the line 1071 of the management table 1003.

As described above, the file access information management system 106 in the first embodiment of the invention is disposed with a correlation to the storage system 105 and the file server system 103. With such a placement, the file access information management system 106 stores, as the file access data 232, information about when the file data 221 stored in the storage system 105 is accessed, i.e., time for file open, time for file close, user, IP address, and operation details. The file access information management system 106 then groups the file access data 232 on the basis of the file data 221, thereby calculating the degree of relevance between the groups of the file access data 232.

The file access information management system 106 also stores, in addition to the file access data 232, link information to the backup data 223 created when the file data 221 is updated.

The file access information management system 106 also compresses the file access data 232 in a unit of group.

As such, when the file access data 232 is large in amount compared with a piece of file data 221, the file access data 232 becomes easily available for use with respect to the file data 221, or the file access data 232 can be compressed in amount.

Moreover, when the file access data 232 is plurally available with respect to a plurality of file data 221, the file access data 232 can be used simultaneously with respect to a plurality of file data 221.

Described next is an information system configured by a calendar application using the file access group data 234 and the web access data 238 created as above.

FIG. 13 is a diagram illustrating calendar data 242 in the first embodiment of the invention.

The calendar server system 107 runs a calendar data generating program 241 at regular intervals, or when the file access group data 234 of a fixed amount is created, thereby generating the calendar data 242 from the file access group data 234, and the web access group data 238.

The calendar data 242 is in the general format of calendar data, e.g., iCalendar, which is defined by the technical specifications RFC 2445 (http://www.ietf.org/rfc/rfc2445.txt) by IETF (Internet Engineering Task Force).

A reference numeral 1100 in FIG. 13 example denotes an example of the calendar data 242. The calendar data generating program 241 generates a file including information about the calendar data 242 in a unit of data, e.g., in a unit of data as below:

in a unit of the file access group data 234 including at least one "write" operation, in a unit of the file access group data 234 including only "read" operation, or in a unit of the web access group data 238.

Alternatively, the calendar data generating program 241 may generate a file including information about the calendar data 242 in a data unit of an access source using information about the IP address 602, e.g., in a unit of the file access group data 234 accessed from "office", in a unit of the file access group data 234 accessed from "home", and in a unit of the file access group data 234 accessed from "mobile terminal".

FIG. 13 shows, under a reference numeral 1101, the file access group data "1001" 741 in the line 741 of the management table 702 in a standard calendar data format.

The calendar data generating program 241 inputs a piece of file access group data 234 into a range enclosed by "BEGIN: VEVENT" such as a line 1111 and "END: VEVENT" such as a line 1119.

The calendar data generating program 241 tracks the management table 500 from the line 741 of the management table 702 with respect to the information about the file access group data "1001" 741, and acquires the following file access data 232, i.e., the file access data "101" 511 (the line 511 of the management table 500), the file access data "102" 512 (the line 512 of the management table 500), the file access data "103" 513 (the line 513 of the management table 500), the file access data "105" 515 (the line 515 of the management table 500), ..., and the file access data "131" 518 (the line 518 of the management table 500).

The calendar data generating program 241 makes an input of the value in the element of "file 504", i.e., "/home/user1/A1/A1presentation.ppt" (the value in the element of "file 504" in the lines 511, 512, 513, 515, ..., and 518 of the management table 500) to a line 1112 of "SUMMARY:", or extracts only the name of file, and makes an input of "A1presentation.ppt" thereto. The value in the element of "file 504" is the one same as the value of the file access group data "1001" 741, i.e., a group of the file access data 232 from the line 511 of the management table 500 with the element of "file access ID 501" showing "101" being the value in the element of "start file access data 732" in the line 741 of the management table 702 to the line 518 in the management table 500 with the element of "file access ID" showing "131" being the value in the element of "end file access data 733".

The calendar data generating program 241 makes an input of "20080530T150502" to a line 1113 of "DTSTART:", indicating the value in the element of "operation start time 502", i.e., "2008/05/30 15:05 02" (the line 511 of the management table 500, in the element of "operation start time 502") in the line 511 of the management table 500 showing, as the file access ID 501, "101" being the value of the start file access data 732 in the line 741 of the management table 702.

The calendar data generating program 241 makes an input of "20080530T164816" to a line 1114 of "DTEND:", indicating the value in the element of "operation end time 503" in the line 518 showing, as the file access ID 501, "131" being the value in the element of "end file access data 733", i.e., 2008/05/30 16:48:16 (the line 518 of the management table 500, the value in the element of "operation end time 503").

The calendar data generating program 241 makes a search of the value in the element of "IP address 602" same as that in the line 741 of the management table 702, i.e., "192.168.3.8" (the value in the element of "IP address 602" of each of the lines 511, 512, 513, 515, ..., and 518 of the management table 500), and makes an input of the resulting values to the line 1115 of "LOCATION:". Alternatively, the calendar data generating program 241 may prepare in advance a list of correlation between the values of the IP address 602 and the names of location, i.e., office names, and using such a list of correlation, may make an input of "SHINAGAWA office" corresponding to the IP address of "192.168.3.8" to a line 1115 of "LOCATION:".

When link information to the backup data 223 is included in the value in the element of "backup 604", the calendar data generating program 241 writes, to a line 1116 of "URL:", any of the link information to the latest backup data 223 being the latest among the values in the element of "backup 604". The values in the element of "backup 604" are those of the file access data 232 configuring the line 741 of the management table 702, i.e., values in the element of "backup 604" of each of the lines 511, 512, 513, 515, ..., and 518 of the management table 500. In FIG. 13 example, the calendar data generating program 241 makes an input of the link information "¥¥file_server¥user1¥¥backup¥A1¥A1presentation_20080530_16 4816.ppt" to the backup data 223 "/home/user1/backup/A1/A1presentation_20080530_164816.ppt".

When the link information to the backup data 223 is not included in the value in the element of "backup 604" of each of the file access data 232 in the file access group data "1001" 741, the calendar data generating program 241 omits the line 1116 of "URL:".

Alternatively, to the line 1116 of "URL:", the calendar data generating program 241 may write link information of "¥¥file_server¥user1¥A1¥A1presentation.ppt" to the value in the element of "file 504" same as that in the line 741 of the management table 702, i.e., "/home/user1/A1/A1presentation.ppt" (the value in the element of "file 504" of each of the lines 511, 512, 513, 515, ..., and 518 of the management table 500).

The calendar data generating program 241 edits the value in the element of "operation 603" of each of the file access data 232 found in the line 741 of the management table 702, i.e., the value in the element of "operation 603" of each of the lines 511, 512, 513, 515 ..., 518 of the management table 500, and inputs the resulting values to the line 1117 of "DESCRIPTION:". The calendar data generating program 241 calculates how many of "read" and "write" are found in the element of "operation 603" in each of the file access data 232 in the file access group data "1001" 741. When the element of "operation 603" includes at least one or more "write", e.g., includes 7 "read" and 20 "write", the calendar data generating program 241 makes an input of "update (read: 7, write: 20)". When the element of "operation 603" shows entirely "read", i.e., includes 27 "read", the calendar data generating program 241 makes an input of "reference (read: 20).

Other than that, the calendar data generating program 241 may input any information to the line 1117 of "DESCRIPTION:", e.g., the file name of any other file access group data 234 showing the high degree of relevance, or URL of any web access group data 238 showing the high degree of relevance.

Alternatively, to the line 1117 of "DESCRIPTION:", the calendar data generating program 241 may input entirely or partially the file data 221 being a target for the line 741 of the management table 702, i.e., "/home/user1/A1/A1presentation.ppt", or may input entirely or partially the backup data 223 thereof, i.e., "/home/user1/backup/A1/A1presentation_20080530_164816.ppt".

The calendar data generating program 241 makes an input of, to the line 1118 of "CATEGORIES:", "file server (update)" for the file access group data 234 including at least one "write" operation, "file server (reference) for the file access group data 234 including only "read" operation, and "web proxy server" for the web access group data 238. The calendar data generating program 241 makes an input of "file server (update)" to the line 1118 of "CATEGORIES:" for the file access group data "1001" 741.

Alternatively, the calendar data generating program 241 may identify the position information such as "office", "home", and "mobile terminal" based on the value in the element of "IP address 602" same as that in the line 741 of the management table 702, and may input the resulting information to the line 1118 of "CATEGORIES:".

In the above description, the calendar data generating program 241 generates the calendar data 242 from the file access group data 234 (file access data 232 being the source of the data (the management table 500 of FIG. 5)) and the web access group data 238 (web access data 236 being the source of data (the management table 900 of FIG. 11)). The calendar data generating program 241 may generate the calendar data 242 from the file access data 232 compressed using the file access group data 234 (the management table 800 of FIG. 10), and the web access data 236 compressed by the web access group data 238.

The calendar data 242 generated as such is read and displayed by the calendar program 202 in the client computer 101. An exemplary display is shown in FIG. 14 under a reference numeral 1200.

Figure 14:
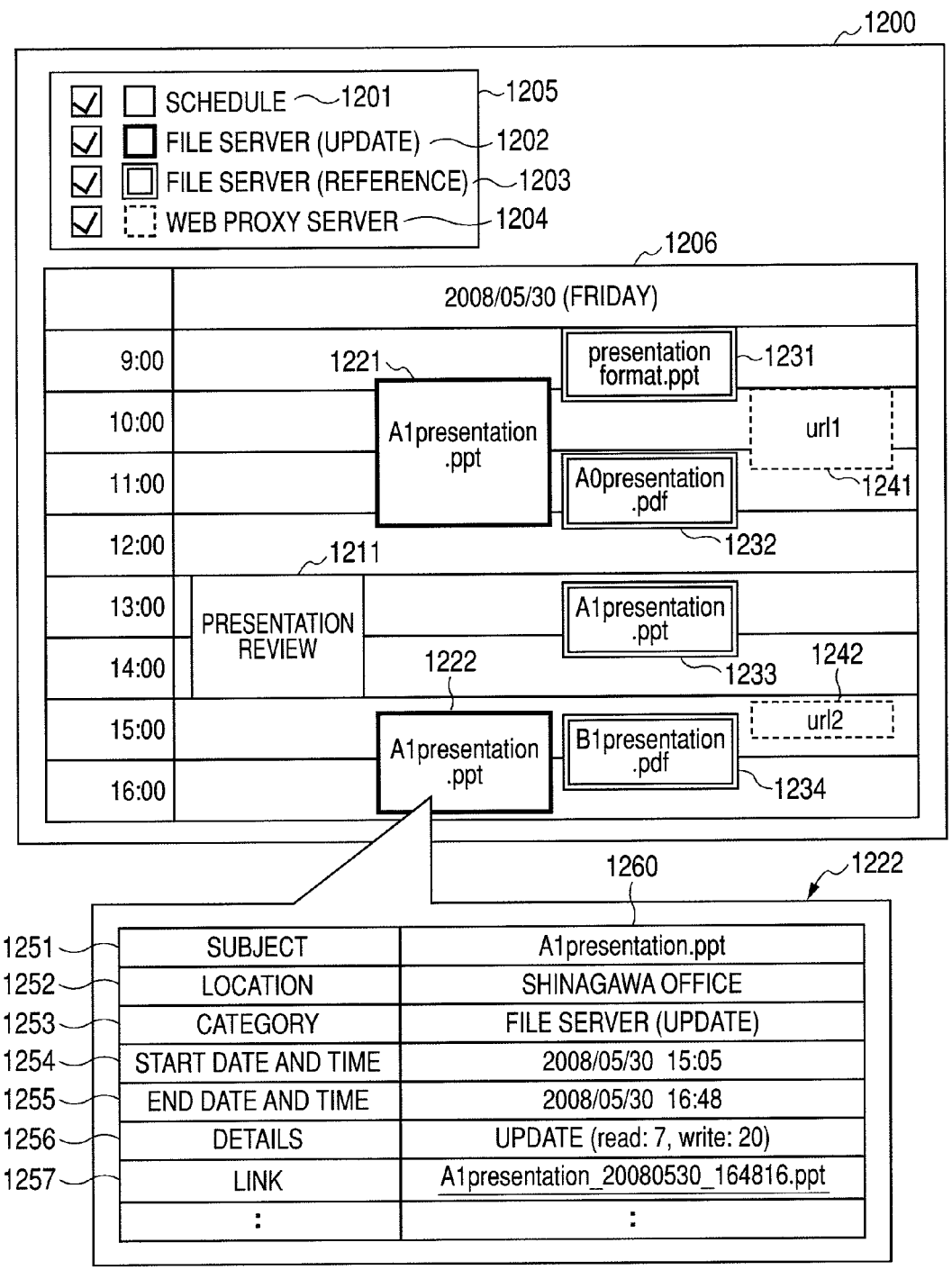
FIG. 14 shows an exemplary display of the calendar data in the first embodiment of the invention.

FIG. 14 shows an exemplary display of the calendar data 242 in the first embodiment of the invention.

An access right toward the calendar data 242 is adhered to an access right toward the file data 221 originally indicated by the calendar data 242.

The calendar program 202 is schedule and calendar application software that can display a data set of a general calendar data format. This software may be executed on a web browser.

When the user puts a check mark in a "schedule 1201" in a legend 1205, the calendar program 202 displays the calendar data that has been input in advance by the user in a calendar data display section 1206 as his or her schedule, e.g., displays a presentation review 1211".

When the user puts a check mark in a "file server (update) 1202" of the legend 1205, the calendar program 202 displays, in the calendar data display section 1206, the calendar data 242 generated from the file access group data 234 including at least one "write" operation, e.g., displays "A1presentation.ppt" 1221, and "A1presentation.ppt" 1222.

When the user puts a check mark in a "file server (reference)" 1203 in the legend 1205, the calendar program 202 displays, in the calendar data display section 1206, the calendar data 242 generated from the file access group data 234 including only "read operation", e.g., displays "presentationformat.ppt" 1231, "A0presentation.pdf" 1232, "A1presentation.ppt" 1233, and "B1presentation.pdf" 1234.

When the user puts a check mark in a "web proxy server" 1204 in the legend 1205, the calendar program 202 displays, in the calendar data display section 1206, the calendar data 242 generated from the web access group data 238, e.g., displays "url1" 1241, and "url2" 1242.

Described below are details 1260 of the calendar data "A1presentation.ppt" 1222 displayed by the calendar program 202.

In the details 1260 of the calendar data "A1presentation.ppt" 1222, the lines, i.e., "subject" line 1251, "location" line 1252, "category" line 1253, "start date and time" line 1254, "end date and time" line 1255, "details" line 1256, and "link" line 1257, are respectively corresponding to the lines in the element 1101 of FIG. 13, i.e., the line 1112 of "SUMMARY:", the line 1115 of "LOCATION:", the line 1118 of "CATEGORIES:", the line 1113 of "DTSTART:", the line 1114 of "DTEND:", the line 1117 of "DESCRIPTION:", and the line 1116 of "URL:".

As described in the foregoing, the information system of the first embodiment of the invention is configured to include the file server system 103 and the storage system 105, and the file access information management system 106 and the calendar server system 107 corresponding thereto. The calendar server system 107 converts the file access group data 234 under the management of the file access information management system 106 into the calendar data 242. The calendar server system 107 provides, to the calendar program 202, in addition to the work history information about the file data 221, link information to the file data 221, or link information to the backup data 223 of the file data 221.

The calendar server system 107 also converts the web access group data 238 under the management of the file access information management system 106 into the calendar data 242, and provides access history information to a web page to the calendar program 202.

As described above, the user thus becomes able to browse the work history with respect to the file data 221. The user also becomes able to simultaneously use the access information with respect to any other related file data.

The user also becomes able to browse the work history of the file data 221 at the same time as the access history to any web page.

Described next is an information system of a second embodiment of the invention.

In the second embodiment, described is an information system configured by a search application using the file access group data 234 and the web access data 238 described in the first embodiment.

Figure 15:
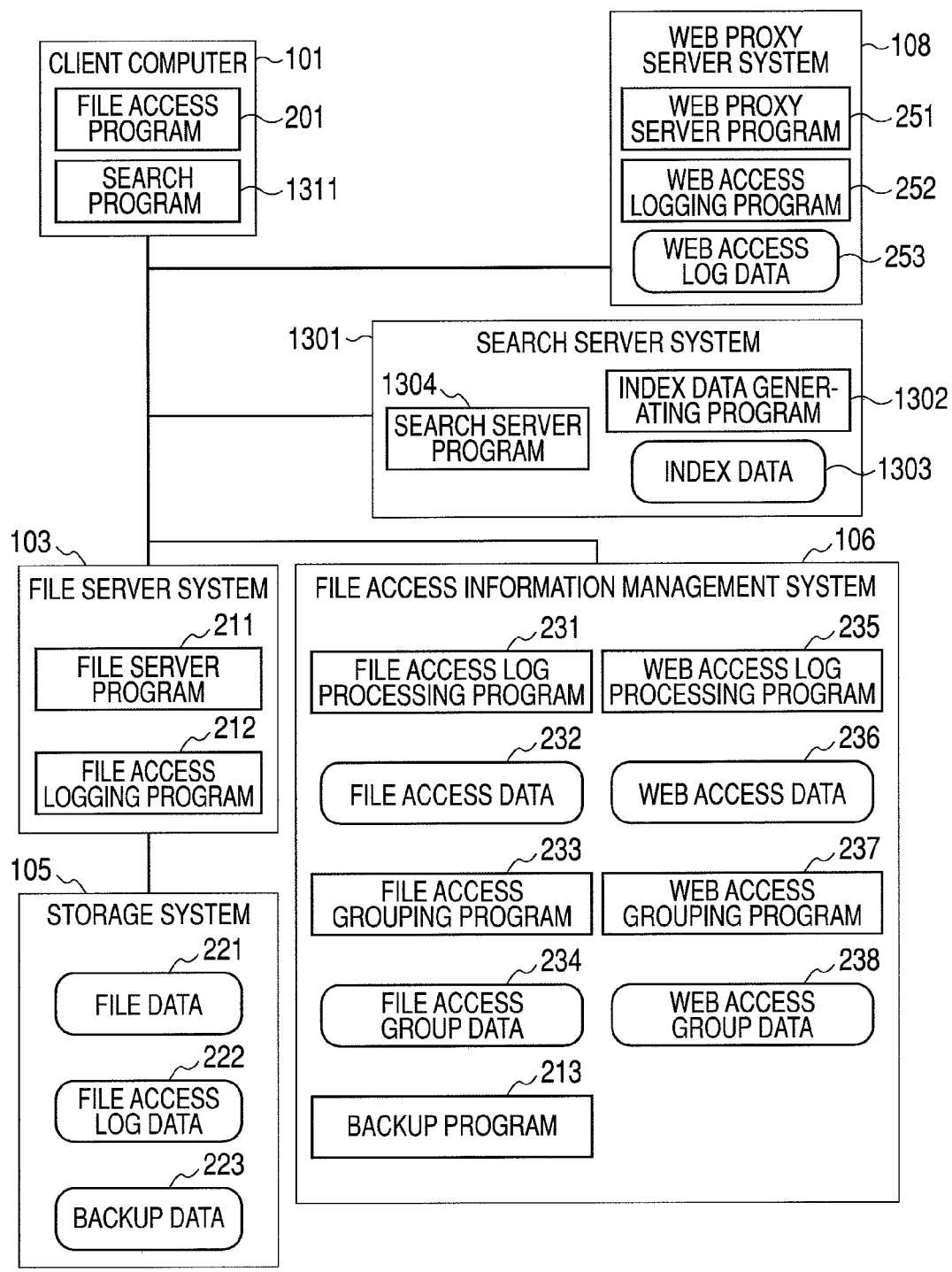
FIG. 15 is a functional configuration diagram of an information system in a second embodiment of the invention.

FIG. 15 is a functional configuration diagram of the information system in the second embodiment of the invention.

Compared with the functional configuration diagram of FIG. 2 in the first embodiment of the invention, the functional configuration diagram of FIG. 15 does not include the calendar server system 107 but a search server system 1301 is provided. Also compared with the functional configuration diagram of FIG. 2, the client computer 101 of FIG. 15 does not also include the calendar program 202 a search data display program 1311 is additionally provided.

The search server system 1301 is of the system configuration same as that of the file access information management system 106 of FIG. 1.

The search server system 1301 serves to offer search services in response to a request from the client computer 101 for searching the file data 221.

A basic process of searching the file data 221 includes the following steps.

The search program 1311 of the client computer 101 forwards a word being a search key to a search server program 1304 of the search server system 1301.

The search server program 1304 makes a search of the file data 221 including such a word, and ranks the search results, i.e., file data 221, in the order in which the word appears.

The search server program 13 04 forwards the search result to the search program 1311, and the search program displays thus provided search result. The search result is a list including the names of the ranked file data 221, summary, link information, and others.

In such a process, for making a search of the file data 221 including the provided word, the search server program 1304 uses index data 1303 of the file data 221. The search server system 1301 runs the index data creation program 1302 at regular intervals, thereby creating the index data 1303 of the file data 221 in advance.

The index data 1303 is index data for use to increase the searchability of the file data 221. For example, in a management table 1401 of FIG. 16A, the index data serves as a management table including a word 1411, and a file data ID 1412 including the word 1411, i.e., identifier uniquely indicating the file data 221.

FIG. 16A is a diagram illustrating a management table of the index data 1303 in the second embodiment of the invention.

FIG. 16B is another diagram illustrating the management table of the index data 1303 in the second embodiment of the invention.

The file access information management system 106 includes a management table of the file access group data 234, and in addition to the management tables 702 and 703 of FIG. 6B, includes a management table 1402 of FIG. 16B.

The management table 1402 serves to establish a correlation between elements of "file access group ID 1413" and "file data ID 1414". The element of "file access group ID 1413" of the management table 1402 is the same as the element of "file access group ID 731" of the management table 702. The element of "file data ID 1414" of the management table 1402 is the same as the element of "file data ID 1412" of the management table 1401.

The search server program 1304 uses the management tables 1401 and 1402, thereby establishing a correlation with respect to the word 1411 provided by the search program 1311 between the element of "file data ID 1412" including the word 1411 and the element of "file access group data ID 1413". This accordingly makes available the file access group data 234 (work history of the file data 221) for search and ranking of the file data 221 being the search results.

The search server program 1304 additionally provides information about the file access group data 234 (work history of the file data 221) to the search result in addition to the information about the file data 221.

Figure 17:
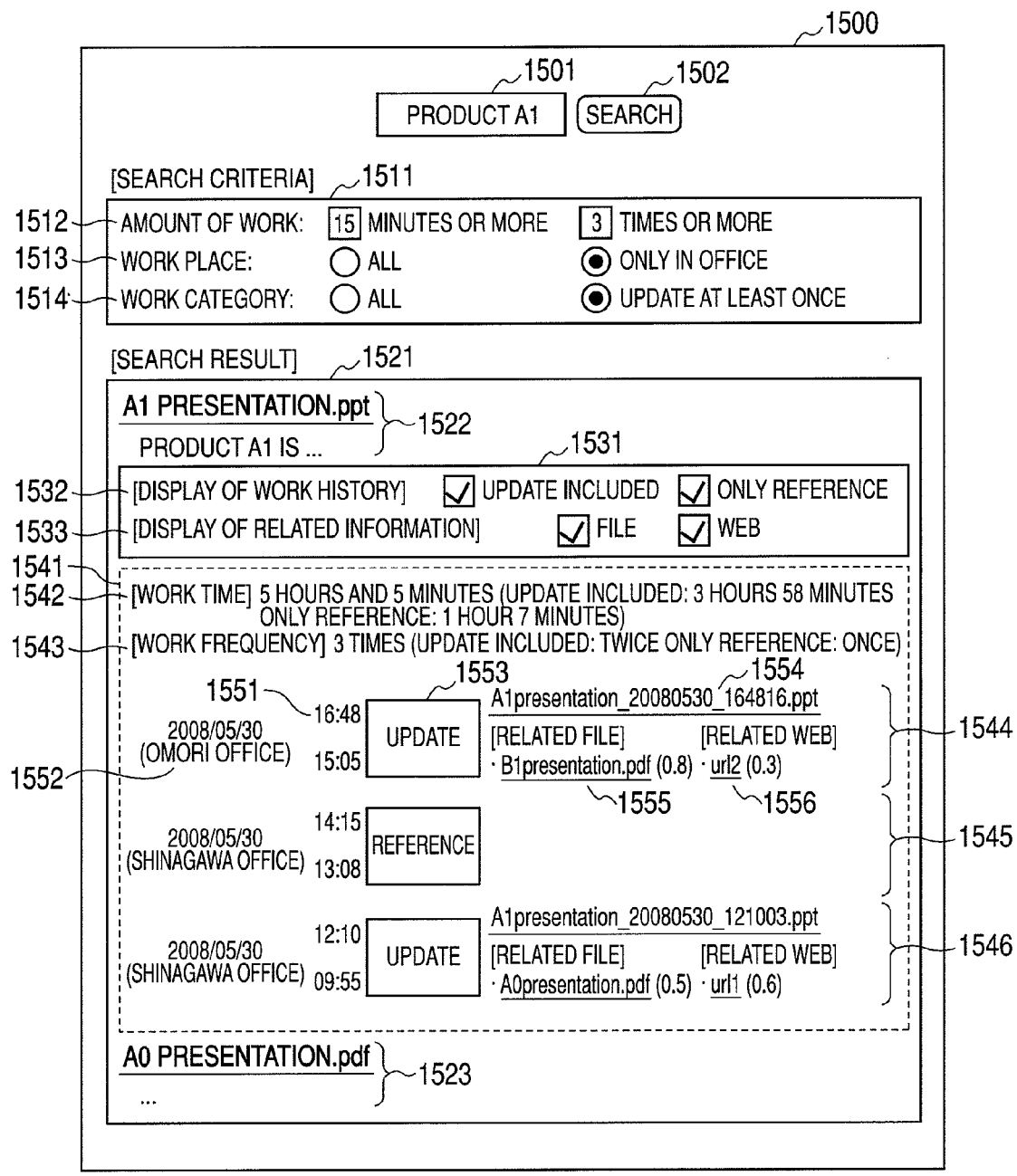
FIG. 17 shows an exemplary display of a search result in the second embodiment of the invention.

FIG. 17 shows an exemplary display of the search results in the second embodiment of the invention.

A reference numeral 1500 in FIG. 17 denotes an exemplary display showing, in the client computer 101, the result of the user's search of the file data 221 including a word "product A1" using any arbitrary application such as web browser.

Described now is the contents of the display example 1500 by the search program 1311.

A user makes an input of a word "product A1" to an input field 1501 of a search keyword, and depresses a search button 1502, thereby acquiring the search result.

The user then makes settings of search requirements in a "search criteria" field 1511.

For a line 1512 of "AMOUNT OF WORK:", the user makes settings of requirements related to the work time of the file data 221, or the requirements related to the work frequency. For the work time, the search server program 1304 refers to the total operating time of all of the file access group data 234 related to the file data 221 being a target. For the work frequency, the search server program 1304 refers to the total operating time of all of the file access group data 234 related to the file data 221 being a target.

For a line 1513 of "WORK PLACE:", the user makes settings of requirements about the location at the time of accessing the file data 221. The search server program 1304 is provided in advance with a list of correlation between the location where the client computer 101 is located, e.g., office name, and the IP address of the location or the network address thereat.

As to information about the location of accessing the file data 221, the search server program 1304 makes a search of the list of correlation described above to find the name of location corresponding to the value in the element of "IP address 602" (management table 500) of the file access group data 234 related to the file data 221. When a line 1513 of "WORK PLACE:" shows "only in office", it means that the IP address 602 of all of the file access group data 234 related to the file data 221 being a target is in the office.

For a line 1514 of "WORK CATEGORY:", the user then makes settings of operation state of the file data 221.

As to the operation information at the time of accessing the file data 221, the search server program 1304 refers to the element of "operation 603" of all of the file access group data 234 related to the file data 221 (management table 500). When the line 1514 of "WORK CATEGORY:" shows "update at least once" means that the element of "operation 603" of the file access group data 234 related to the file data 221 being a target includes at least one "write".

The "search criteria" field 1511 in this example is surely not restrictive, and the search server program 1304 may use all of the information about the file access group data 234 (the management table 500 or the management table 800 after compression). For example, the search server program 1304 may use information about work date and time (refer to the elements of "operation start time 502" and "operation end time 503"), the target directory (refer to the element of "file 504"), the user and group (refer to the element of "user 505" and "group 601")

The search program 1311 displays the search result in a "search result" field 1521.

The search program 1311 displays, in the order of ranking, the information about the name of the found file data 221, link information, a part of the details of the link information, and others, e.g., "A1 presentatin.ppt" and "product A1 is . . . " 1522, and "A0presentation.pdf" and " . . . " 1523.

In a field 1531, in addition to the information 1522 of "A1 presentation.ppt", the user designates the work history information displayed by the "A1 presentation.ppt", i.e., the file access group data 234. The search program 1311 displays information about the file access group data 234 based on the requirements designated in the field 1531, and such information display is made in a field 1541.

The user designates the operation details of the work history for display in a line 1532 of "display of work history". Based on the designation made to the operation details for display, the search program 1311 designates which of the file access group data 234 related to the file data 221 is to be displayed.

In the line 1532 of "display of work history", when a check mark is put in "update included", the search program 1311 displays, in the field 1541, information about any of the file access group data 234 showing at least one "write" in the element of "operation 603".

In the line 1532 of "display of work history", when a check mark is put in "reference only", the search program 1311 displays, in the field 1541, information about any of the file access group data 234 showing entirely "read" in the element of "operation 603".

In accordance with the user's destination made in the line 1533 of "display of related information", the search program 1311 also designates whether or not to display information about any other related file access group data 234 and information about the web access group data 234 to suite the file access group data 234 set in requirements in the line 1532 of "display of work history".

In the line 1533 of "display of related information", when a check mark is put in "file", the search program 1311 displays information about any related file access group data 234. Information to be displayed can be derived by the search server program 1304 making a search of any other file access group data 234 related to the file access group data 234 using the management table 703.

In the line 1533 of "display of work history", when a check mark is put in "web", the search program 1311 displays information about any related web access group data 238. Information to be displayed can be derived by the search server program 1304 making a search of the web access group data 238 related to the file access group data 234 using the management table 1003.

Based on the requirements designated in the field 1531, the field 1541 displays information about the work history of the file access group data 234.

The search program 1311 displays, in the line 1542 of "work time", the total operation time of the file access group data 234.

The search program 1311 displays, in the line 1543 of "work frequency", the total number of the file access group data 234.

In fields 1544, 1545, and 1546, the search program 1311 displays information about the file access group data 234, and any other file access group data 234 and web access group data 238 related thereto, respectively. The field 1544 shows an exemplary display of information about the file access group data "1001" 741.

A field 1551 of "2008/05/30 15:05 16:48" is a display example of values as a result of editing the value in the element of "operation start time 502" (the management table 500) and the value in the element of "operation end time 503" (the management table 500) by the search program 1311. The value in the element of "operation start time 502" is of the start file access data "101" 511 belonging to the file access group data "1001" 741, and the value in the element of "operation end time 503" is of the end file access data "131" 518 belonging thereto.

A field 1552 of "OMORI office" is a display example by the search program 1311 showing the name of place, i.e., office name, corresponding to the value in the element of "IP address 602" (the management table 500) same as that in the line 741 of the management table 702.

A field 1553 of "update" is a display example by the search program 1331 showing that any of the values in the element of "operation 603" in the line 741 of the management table 702 (the management table 500) shows "write".

A field 1554 of "A1 presentation_20080530_164816.ppt" is a display example by the search program 1331 showing link information to the latest backup data 223 in the value of the element of "backup 604" in the line 741 of the management table 702 (the management table 500).

In a field 1555 of "related file B1presentation.pdf (0.8)", "B1presentation.pdf" is a display example by the search program 1311 of the line 742 of the management table 702 related to the line 741 of the management table 702. The search program 1311 shows, in the field 1555 of "B1presentation.pdf (0.8)", the link information to the value in the element of "file 504" same as that in the line 742 of the management table 702 (the management table 500). Alternatively, the search program 1311 may display, in the field 1555 of "B1presentation.pdf (0.8)", the link information to the value in the element of "backup 604" in the line 742 of the management table 702.

In the field 1555 of "B1presentation.pdf(0.8)", the bracketed number "0.8" after the file name is the value shown in the management table 703 in the element of "degree of relevance 763" in the line 742 of the management table 702 with respect to the line 741 of the management table 702.

Herein, the search program 1311 may display, after "B1presentation.pdf(0.8)", a part of the details thereof.

When any other related file access group data 234 is found plurally, the search program 1311 may display the data in the order of the values in the element of "degree of relevance 763". Alternatively, the search program 1311 may display a limited number of the file access group data 234 in the order of values in the element of "degree of relevance 763".

A field 1556 of "related web url2(0.3)" is a display example by the search program 1311 showing the line 1042 of the management table 1002 in the line 742 of the management table 702. The display is related to the display of the file access group data "1002" 742 in the field 1555 of "related file B1presentation.pdf (0.8)" described above.

As described above, the information system of the second embodiment of the invention is configured to include the file access information management system 106 and the search server system 1301 disposed with a correlation to the file server system 103 and the storage system 105, respectively. The file access information management system 106 establishes a correlation of the file access group data 234 to the file data 221. The search server system 1301 creates the index data 1303 of the file data 221, and at the time of search of the file data 221, in addition to information about the file data 221, provides information about the file access group data 234 of the file data 221 to the search program 1311.

At the time of search of the file data 221, the search server system 1301 provides, to the search program 1311, information about the file access group data 234 related to the file access group data 234 of the file data 221 in addition to information about the file data 221.

The search server system 1301 also provides, to the search program 1311, information about the web access group data 238 related to the file access group data 234 of the file data 221 in addition to information about the file data 221.

Moreover, a search can be made to any other related file data 221 and any web page at the time of operation of the file data 221.

Described next is an information system of a third embodiment of the invention.

In the third embodiment, described is an information system configured by a hierarchy storage management application using the file access group data 234 and the web access data 238 described in the first embodiment.

Figure 18:
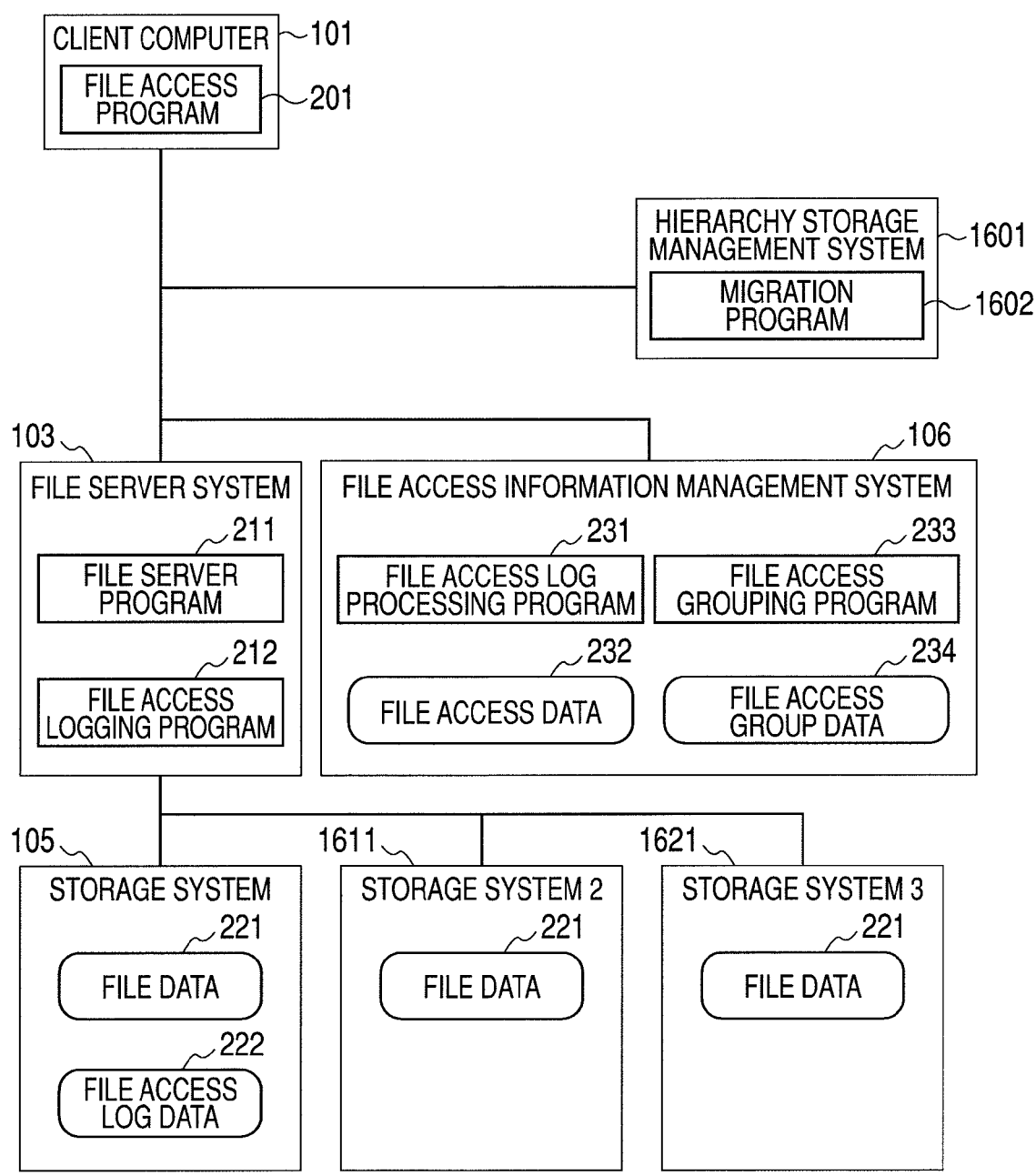
FIG. 18 is a functional configuration diagram of an information system in a third embodiment of the invention.

FIG. 18 is a diagram showing the functional configuration of the information system of the third embodiment of the invention.

Compared with the functional configuration diagram of FIG. 2 in the first embodiment of the invention, the functional configuration diagram of FIG. 18 does not include the calendar server system 107 and the web proxy server system 108, but includes a hierarchy storage management system (1601), a storage system 2 (1611), and a storage system 3 (1621). The client computer 101 of FIG. 18 does not include the calendar program 202, and the file access information management system 106 does not include the web access log processing program 235, the web access data 236, the web access grouping program 237, the web access group data 238, and the backup program 213. The storage system 105 does not include the backup data 223.

The storage system 2 (1611) and the storage system 3 (1621) is of the system configuration same as that of the storage system 105, and together with the storage system 105, configure a so-called hierarchy storage system.

In FIG. 18 example, the storage system 105 is a high-speed storage, the storage system 2 (1611) is a low-speed (near-line) storage, and the storage system 3 (1621) is a power-saving storage with the MAID (Massive Arrays of Inactive Disks) function. The storage system 3 (1621) may be a virtual tape library device, or a tape library device.

The file data 221 is stored in any of the storage system 105, the storage system 2 (1611), and the storage system 3 (1621) based on the access history, i.e., the file access group data 234.

Note here that even when the file data 221 is stored in any of the storage system 105, the storage system 2 (1611), and the storage system 3 (1621), to allow a user using the file access program 201 of the client computer 101 to make a search using the same directory path, the file system of the file server 103 manages the storage location of the file data 221.

The hierarchy storage management system 1601 is of the system configuration same as that of the file access information management system 106 of FIG. 1.

A migration program 1602 of the hierarchy storage management system 1601 refers to the access history of the file data 221, i.e., the file access group data 234, and stores the file data 221 in any appropriate location in any of the storage system 105, the storage system 2 (1611), and the storage system 3 (1621).

By referring to the flowchart of FIG. 19 and the diagram of FIG. 20, described next is a migration process of the file data 221 by the migration program 1602.

Figure 19:
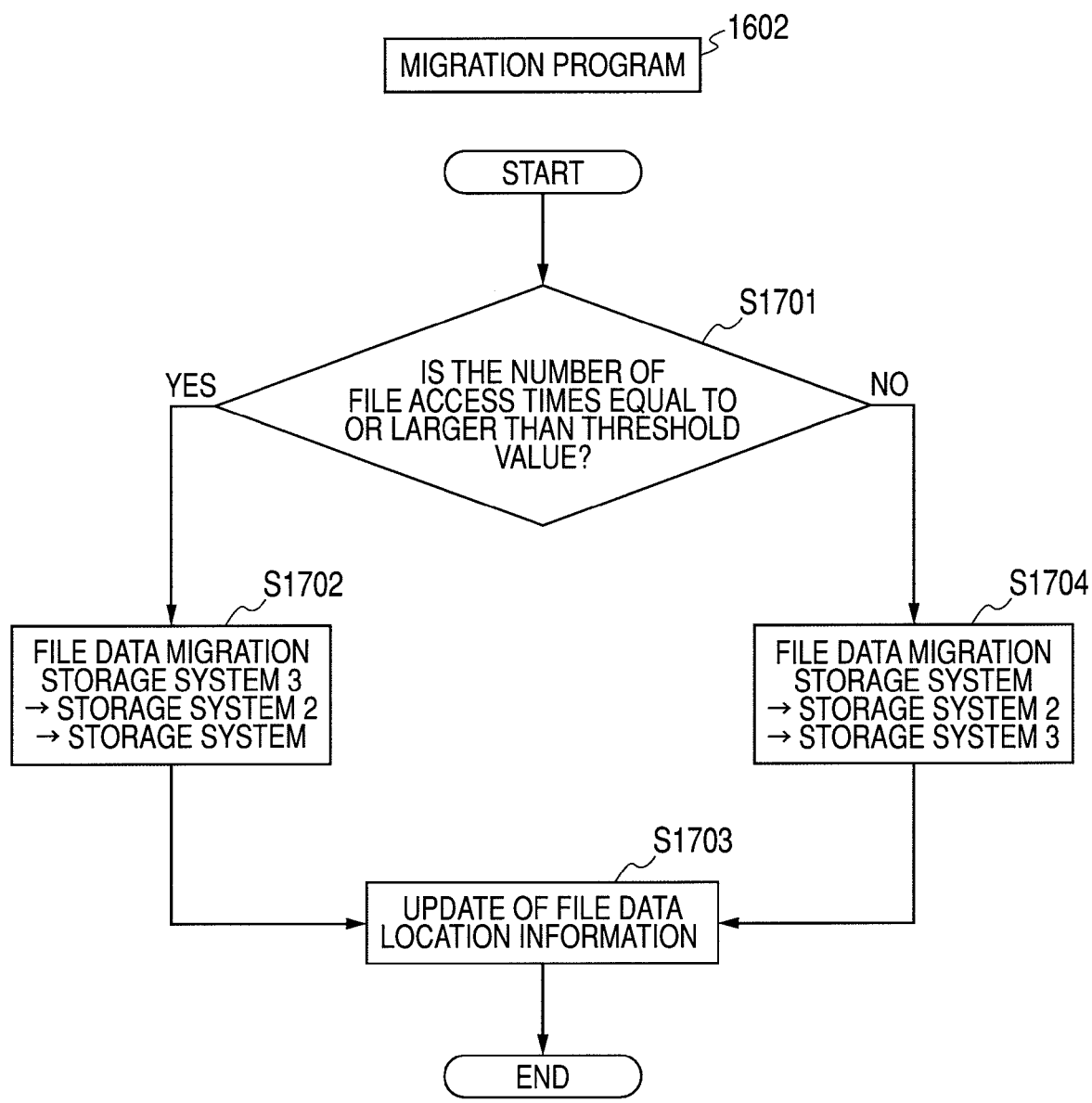
FIG. 19 is a flowchart of a migration process in the third embodiment of the invention.

FIG. 19 is a flowchart of the migration process in the third embodiment of the invention.

The migration program 1602 refers to the file access group data 234 of the file data 221 based on a management table 1402 of FIG. 16B, and determines whether or not the same file data 221 is accessed with a frequency of a threshold number or more (S1701). The threshold number means a value arbitrarily defined by the user, e.g., 3 minutes or more of operation time in 3 days, or 5 times or more of work frequency in 3 days.

In the flowchart of FIG. 19, for the operation time, the migration program 1602 uses the total operation time of all of the file access group data 234 in any designated period of time related to the target file data 221.

The migration program 1602 also uses, for the work frequency, the total number of the file access group data 234 in any designated period of time in the target file data 221.

The migration program 1602 executes the migration process in accordance with whether there are accesses of the above-described threshold number or more (S1702).

When there are not accesses of the threshold number or more, the migration program 1602 changes the storage location of the file data 221 in the order of the storage system 105, the storage system 2 (1611), and the storage system 3 (1621).

When there are accesses of the threshold number or more, the migration program 1602 changes the storage location of the file data 221 in the order of the storage system 3 (1621), the storage system 2 (1611), and the storage system 105.

At this time, the migration program 1602 may refer to the management table 703, and in addition to the file data 221 being a migration target, may set as a migration target any other file data 221 showing the high degree of relevance with the file data 221.

The high degree of relevance here means that there are an arbitrary number of pair of file access group data 234 of the file data 221 being a migration target and the file access group data 234 of any other file data 221 showing a value of a predetermined threshold value or more in the element of "degree of relevance 763". Alternatively, it means that any same operation time is equal to or longer than a time defined separately.

In the management table 703 of FIG. 6C, for example, as to the file data 221 being a migration target and the file data 221 related thereto, when there are ten or more pairs of elements of "file access group ID 761" and "file access group ID 762" showing the value of 0.8 or more in the element of "degree of relevance 763", it is referred to as the degree of relevance being high. The degree of relevance is also referred to as being high when the operation time shared by the pair(s) showing the value of 0.8 or more in the element of "degree of relevance 763" is an hour or longer.

FIG. 20 is a diagram illustrating a management table 1801 of the storage location of the file data in the third embodiment of the invention.

The management table 1801 includes elements of "file data ID 1810", "storage ID 1811", and "location 1812".

The migration program 1602 updates the management table 1801 of the storage location of the file data 221 stored in the file server system 103 in accordance with the migration process of the file data 221 (S1703).

In S1703, the migration program 1602 updates the ID of the storage system in storage (the storage ID 1811), and the storage location such as device name and others (the location 1812) in accordance with the storage location of the file data 221.

At this time, the migration program 1602 updates the ID of the storage system in storage (the storage ID 1811), and the storage location such as device name and others (the location 1812) not only for the file data 221 but also for any other file data 221 showing the high degree of relevance after migration.

As described above, the information system of the third embodiment of the invention is configured to include the file access information management system 106 and the hierarchy storage management system 1601 disposed with a correlation to the file server system 103 and the storage system 105. At the time of migration of the file data 221, the hierarchy storage system management system 1602 migrates not only the file data but also any other file data 221 showing a high degree of relevance thereto.

As such, the access capabilities with respect to a plurality of file data 221 showing a high degree of relevance thereamong can be kept the same.

What is claimed is:

1. A computer system, comprising:
a storage subsystem that stores file data;
a file server that provides a computer with the file data stored in the storage subsystem; and
a management device that is connected to the file server, and that collects information about access to the file data, wherein the management device
  collects, as access data, a log about the access to the file data stored in the storage subsystem,
  groups the access data about a same file data as grouped access data about the file data, and
  defines a degree of relevance between the file data using a file access time indicated by the grouped access data about the file data;
a calendar server, wherein
the management device collects, as the access data, information about backup data created at a time of updating the file data stored in the storage subsystem, and
the calendar server
  converts the grouped access data into calendar data in which groups of the access data are displayed along a time axis, and
  generates data for display, in a calendar format along the time axis, a group of the log about the access to the file data, and a group of the information about the backup data of the file data.

2. The computer system according to claim 1, further comprising a web proxy server, wherein
the management device
  analyzes a log about access to a web page acquired from the web proxy server,
  collects the access data at least including: a time to start access to the web page, a time to end the access to the web page, a user which accessed the web page, an IP address of an access source to the web page, or operation details about the accessed web page, and
  groups the access data about the same web page, as grouped access data about the web page, and
the calendar server
  converts, into calendar data in which groups of the access data are displayed along a time axis, the grouped access data about the file data and the grouped access data about the web page, and
  generates data for display, in a calendar format along the time axis, a group of the log about the access to the file data, a group of the information about the backup data of the file data, and a group of the log about the access to the web page.

3. The computer system according to claim 1, further comprising a search server, wherein
the management device establishes a correlation between the file data and the group of the access data about the file data, and
the search server
  creates an index for establishing a correlation between the file data and a word in the file data, and
  generates data for display of, on a search result of the file data made based on the word, at least information about the file data, information about the log, or information about the backup data.

4. The computer system according to claim 3, wherein
the search server generates data for display of, on the search result of the file data made based on the word, information about any other file data related to the access log of found file data.

5. The computer system according to claim 3, wherein
the search server generates data for display of, on the search result of the file data made based on the word, information about a web page related to an operation of found file data.

6. The computer system according to claim 1, further comprising a hierarchy storage management system, wherein for migration of the file data, the hierarchy storage management system also migrates any of the file data showing a high degree of relevance with the file data.

7. The computer system according to claim 1, wherein
the management device
  collects the access data at least including: a time to open the accessed file data, a time to close the accessed file data, a user which accessed to the file data, an IP address of an access source to the file data, operation details about the accessed file data, or information about backup data created at the time of updating the file data,
  creates, for any of the access logs showing the same user, the same IP address, and the same file data within a predetermined length of time, a correlation table between the access log and the access logs therebefore and thereafter, and
  groups the access logs based on the resulting correlation table.

8. A computer system, comprising:
a storage subsystem that stores file data;
a file server that provides a computer with file data stored in the storage subsystem;
a web proxy server that collects a log about access to a web page; and
  a management device that is connected to the file server and the web proxy server, and that collects information about access to the file data and information about access to the web page, wherein
the management device
  collects access data at least including: a time to open the accessed file data, a time to close the accessed file data, a user which accessed the file data, an IP address of an access source to the file data, operation details about the accessed file data, and information about backup data created at the time of updating the file data,
  analyzes the log about the access to the web page acquired from the web proxy server,
  collects the access data at least including a time to start access to the web page, a time to end the access to the web page, a user which accessed the web page, an IP address of an access source to the web page, or operation details about the accessed web page,
  groups the access data about the same file data and the same web page,
  compresses the grouped access data, and
  defines a degree of relevance between the file data and a degree of relevance between the file data and the web page using a file access time indicated by the grouped access data;
a calendar server, wherein
the management device collects, as the access data, information about backup data created at the time of updating the file data stored in the storage subsystem, and
the calendar server
  converts the grouped access data into calendar data in which groups of the access data are displayed along a time axis, and
generates data for display, in a calendar format along the time axis, a group of the log about the access to the file data, and a group of the information about the backup data of the file data.

* * * * *